United States Patent
Hashiguchi et al.

(10) Patent No.: US 10,904,918 B2
(45) Date of Patent: Jan. 26, 2021

(54) COMMUNICATION APPARATUS AND METHOD, AND COMMUNICATION SYSTEM

(71) Applicant: Sony Corporation, Tokyo (JP)

(72) Inventors: Takaaki Hashiguchi, Tokyo (JP); Hiroyuki Mita, Saitama (JP); Osamu Kozakai, Kanagawa (JP); Yusuke Yoneyama, Tokyo (JP)

(73) Assignee: Sony Corporation, Tokyo (JP)

( * ) Notice: Subject to any disclaimer, the term of this patent is extended or adjusted under 35 U.S.C. 154(b) by 93 days.

(21) Appl. No.: 16/072,762

(22) PCT Filed: Feb. 1, 2017

(86) PCT No.: PCT/JP2017/003530
§ 371 (c)(1),
(2) Date: Jul. 25, 2018

(87) PCT Pub. No.: WO2017/141700
PCT Pub. Date: Aug. 24, 2017

(65) Prior Publication Data
US 2019/0037599 A1     Jan. 31, 2019

(30) Foreign Application Priority Data
Feb. 15, 2016    (JP) ................. 2016-026012

(51) Int. Cl.
*H04W 72/04*      (2009.01)
*H04W 74/08*      (2009.01)
(Continued)

(52) U.S. Cl.
CPC .......... *H04W 74/0808* (2013.01); *H04B 1/04* (2013.01); *H04B 1/385* (2013.01);
(Continued)

(58) Field of Classification Search
None
See application file for complete search history.

(56) References Cited

U.S. PATENT DOCUMENTS 6,157,616 A * 12/2000 Whitehead .............. H04L 47/10
370/252
2004/0214595 A1* 10/2004 Hogyoku ................. H04B 1/44
455/550.1

(Continued)

FOREIGN PATENT DOCUMENTS

JP    52-155005    12/1977
JP    11-308142 A    11/1999
(Continued)

*Primary Examiner* — Duc T Duong
(74) *Attorney, Agent, or Firm* — Michael Best & Friedrich LLP

(57) ABSTRACT

The present technology relates to communication apparatus and method, and a communication system that enable communication control according to a gain of an antenna element.

In a communication apparatus that performs wireless communication via an antenna element, a state of a gain of the antenna element is detected, a threshold value for carrier sense is controlled on the basis of the state of the gain of the antenna element that has been detected, the carrier sense is performed to determine whether communication using the threshold value that has been set possible, and wireless communication is performed in a case where it is determined that the communication is possible. The present disclosure can be applied to, for example, a transmission apparatus, a reception apparatus, a transmission/reception apparatus, a communication apparatus, electronic equipment, a computer, a program, a storage medium, a system, and the like.

20 Claims, 20 Drawing Sheets

(51) Int. Cl.

| | | |
|---|---|---|
| H04W 4/80 | (2018.01) | |
| H04B 1/3827 | (2015.01) | |
| H04B 1/04 | (2006.01) | |
| H04W 4/029 | (2018.01) | |
| H04B 7/08 | (2006.01) | |
| H04B 17/318 | (2015.01) | |
| H04B 17/10 | (2015.01) | |
| H04W 4/02 | (2018.01) | |
| H04W 52/38 | (2009.01) | |
| H04B 17/26 | (2015.01) | |
| H04L 29/08 | (2006.01) | |
| H04W 52/52 | (2009.01) | |
| H04W 52/28 | (2009.01) | |
| H04W 52/40 | (2009.01) | |

(52) U.S. Cl.
CPC ......... *H04B 1/3827* (2013.01); *H04B 7/0805* (2013.01); *H04B 17/102* (2015.01); *H04B 17/318* (2015.01); *H04W 4/02* (2013.01); *H04W 4/029* (2018.02); *H04W 52/38* (2013.01); *H04W 72/0473* (2013.01); *H04B 17/26* (2015.01); *H04L 67/26* (2013.01); *H04W 4/80* (2018.02); *H04W 52/283* (2013.01); *H04W 52/40* (2013.01); *H04W 52/52* (2013.01)

(56) References Cited

U.S. PATENT DOCUMENTS

| | | | | |
|---|---|---|---|---|
| 2004/0259511 | A1* | 12/2004 | Liu | H03G 3/3052 |
| | | | | 455/136 |
| 2006/0280204 | A1* | 12/2006 | Nagata | H04L 1/1671 |
| | | | | 370/473 |
| 2007/0019592 | A1* | 1/2007 | Otsuki | H04W 74/0816 |
| | | | | 370/338 |
| 2009/0247182 | A1* | 10/2009 | Tamate | H04W 72/082 |
| | | | | 455/452.2 |
| 2010/0290355 | A1* | 11/2010 | Roy | H04L 47/14 |
| | | | | 370/252 |
| 2012/0195296 | A1* | 8/2012 | Adachi | H04W 16/14 |
| | | | | 370/338 |
| 2013/0210350 | A1* | 8/2013 | Ling | H04W 4/80 |
| | | | | 455/41.1 |
| 2014/0226497 | A1* | 8/2014 | Ding | H04W 28/0231 |
| | | | | 370/252 |
| 2016/0174206 | A1* | 6/2016 | Xia | H04L 1/00 |
| | | | | 370/329 |
| 2017/0118771 | A1* | 4/2017 | Kazmi | H04L 5/001 |
| 2017/0180088 | A1* | 6/2017 | Adachi | H04W 84/12 |

FOREIGN PATENT DOCUMENTS

| | | |
|---|---|---|
| JP | 2004-208260 A | 7/2004 |
| JP | 2007-110192 A | 4/2007 |
| JP | 2006-042383 A | 2/2008 |
| JP | 2010-087701 A | 4/2010 |
| JP | 2013-214865 A | 10/2013 |
| WO | 2015/006537 A2 | 1/2015 |

* cited by examiner

FIG. 16

| STATE | ANTENNA DETECTION | HUMAN BODY DETECTION | TRANSMISSION ELECTRIC POWER [mW] | THRESHOLD VALUE [dBm] |
|---|---|---|---|---|
| A | ○ | ○ | 5 | −65 |
| B | × | × | 10 | −70 |
| C | × | ○ | 20 | −80 |

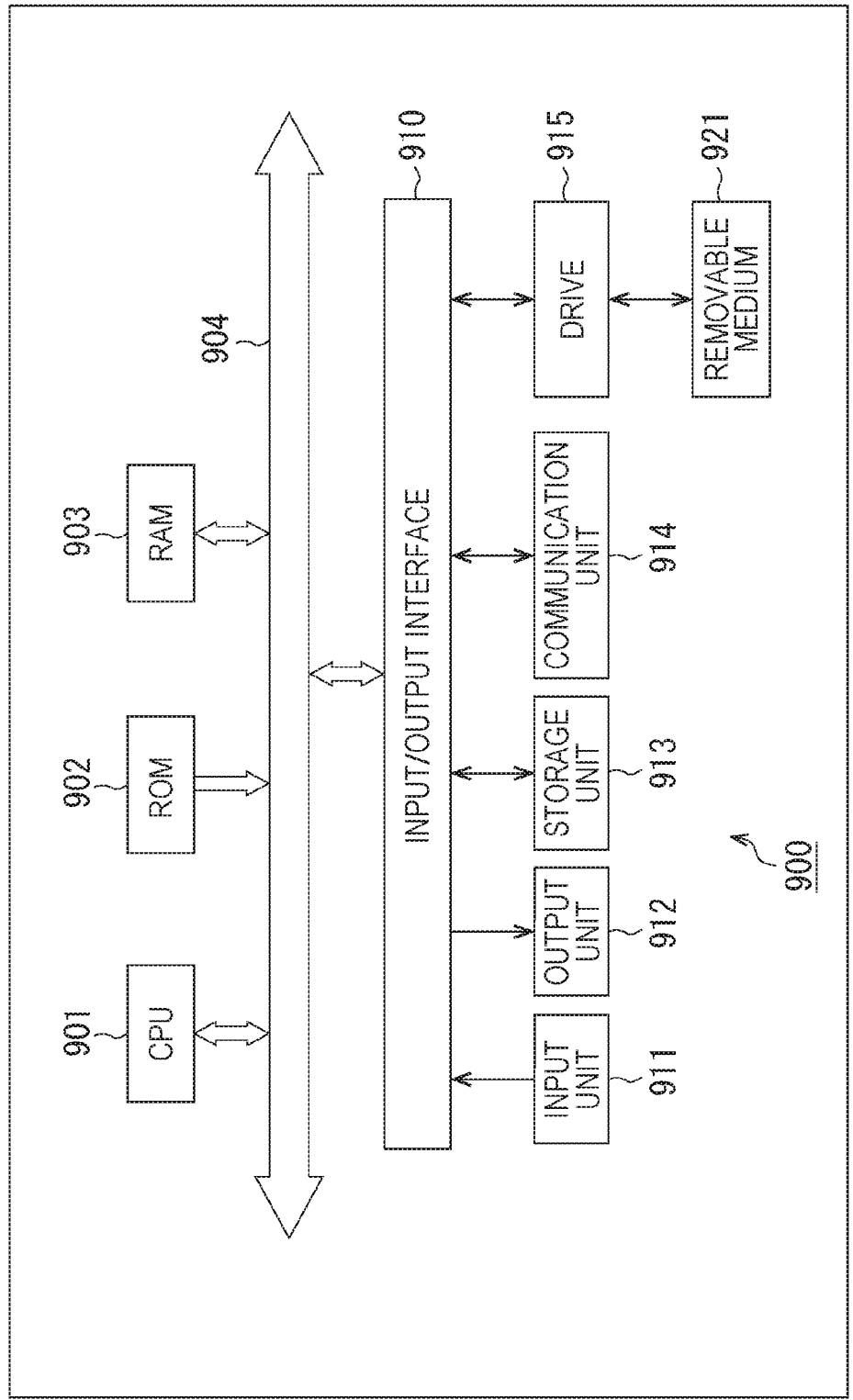

COMMUNICATION APPARATUS AND METHOD, AND COMMUNICATION SYSTEM

TECHNICAL FIELD

The present technology relates to communication apparatus and method, and a communication system and, in particular, to communication apparatus and method, and a communication system that enable communication control according to a gain of an antenna element.

BACKGROUND ART

Conventionally, in a communication apparatus that performs wireless communication, it is conceived to perform carrier sense to check whether a band in which a wireless signal is to be transmitted is free before transmitting the wireless signal. In addition, as one approach of communication control, a method of controlling a threshold value used for such carrier sense has been conceived.

For example, a method of setting a threshold value for carrier sense on the basis of the vehicle density in an inter-vehicle communication apparatus has been conceived (for example, refer to Patent Document 1). In addition, for example, a method of setting a threshold value for carrier sense according to a past carrier sense result has been conceived (for example, refer to Patent Document 2). Furthermore, for example, a method of capturing a wave of a reception signal and setting a threshold value for carrier sense according to the level of a captured wave signal has been conceived (for example, refer to Patent Document 3).

CITATION LIST

Patent Document

Patent Document 1: Japanese Patent Application Laid-Open No. 2010-87701
Patent Document 2: Japanese Patent Application Laid-Open No. 2008-42383
Patent Document 3: Japanese Patent Application Laid-Open No. 2007-110192

SUMMARY OF THE INVENTION

Problems to be Solved by the Invention

However, in such a situation that the gain of the antenna element changes, it is difficult to properly set the threshold value for carrier sense with these methods. That is, it is difficult to perform proper communication control, and, for example, there has been a fear of performing improper communication control such as excessive detection of disturbance waves by the carrier sense and excessive transmission stop.

The present technology has been proposed in view of such a situation and it is an object to perform communication control according to the gain of the antenna element.

Solutions to Problems

A communication apparatus according to an aspect of the present technology is a communication apparatus that performs wireless communication via an antenna element, the communication apparatus including: a state detection unit that detects a state of a gain of the antenna element; a control unit that controls a threshold value for carrier sense on the basis of the state of the gain of the antenna element detected by the state detection unit; a carrier sense unit that performs the carrier sense and determines whether communication using the threshold value set by the control unit is possible; and a communication unit that performs wireless communication in a case where it is determined by the carrier sense unit that the communication is possible.

The state detection unit can detect a coupled antenna element positioned in the vicinity of the communication apparatus and having a higher gain than a gain of the antenna element of the communication apparatus.

The state detection unit can detect the coupled antenna element by detecting a change in a magnetic field around the communication apparatus.

The control unit can set the threshold value to a value for a state in which a gain of the antenna element is high in a case where the coupled antenna element is detected by the state detection unit, and can set the threshold value to a value for a state in which a gain of the antenna element is low in a case where the coupled antenna element is not detected by the state detection unit.

The state detection unit can detect a human body positioned in the vicinity of the communication apparatus.

The state detection unit can detect the human body by detecting a change in capacitance.

The control unit can set the threshold value to a value for a state in which a gain of the antenna element is low in a case where the human body is detected by the state detection unit, and can set the threshold value to a value for a state in which a gain of the antenna element is high in a case where the human body is not detected by the state detection unit.

The state detection unit can detect a coupled antenna element positioned in the vicinity of the communication apparatus and having a higher gain than a gain of the antenna element of the communication apparatus and can detect a human body positioned in the vicinity of the communication apparatus.

The control unit can set the threshold value to a value for a state in which a gain of the antenna element is high in a case where the coupled antenna element is detected by the state detection unit, can set the threshold value to a value for a state in which a gain of the antenna element is medium in a case where either the coupled antenna element or the human body is not detected by the state detection unit, and can set the threshold value to a value for a state in which a gain of the antenna element is low in a case where the coupled antenna element is not detected but the human body is detected by the state detection unit.

The control unit can set the threshold value to a value according to the state of the gain of the antenna element detected by the state detection unit, on the basis of table information indicating a correspondence relationship between the state of the gain of the antenna element and the threshold value.

The control unit can further control transmission electric power for a transmission signal on the basis of the state of the gain of the antenna element detected by the state detection unit, and the communication unit can transmit the transmission signal with the transmission electric power set by the control unit.

The state detection unit can detect a coupled antenna element positioned in the vicinity of the communication apparatus and having a higher gain than a gain of the antenna element of the communication apparatus, and the control unit can set the transmission electric power to a value for a state in which a gain of the antenna element is high in a case where the coupled antenna element is detected by the state detection unit, and can set the transmission electric power to a value for a state in which a gain of the antenna element is low in a case where the coupled antenna element is not detected by the state detection unit.

The state detection unit can detect a human body positioned in the vicinity of the communication apparatus, and the control unit can set the transmission electric power to a value for a state in which a gain of the antenna element is low in a case where the human body is detected by the state detection unit, and can set the transmission electric power to a value for a state in which a gain of the antenna element is high in a case where the human body is not detected by the state detection unit.

The state detection unit can detect a coupled antenna element positioned in the vicinity of the communication apparatus and having a higher gain than a gain of the antenna element of the communication apparatus and detect a human body positioned in the vicinity of the communication apparatus, and the control unit can set the transmission electric power to a value for a state in which a gain of the antenna element is high in a case where the coupled antenna element is detected by the state detection unit, can set the transmission electric power to a value for a state in which a gain of the antenna element is medium in a case where either the coupled antenna element or the human body is not detected by the state detection unit, and can set the transmission electric power to a value for a state in which a gain of the antenna element is low in a case where the coupled antenna element is not detected but the human body is detected by the state detection unit.

The control unit can set the transmission electric power to a value according to the state of the gain of the antenna element detected by the state detection unit, on the basis of table information indicating a correspondence relationship between the state of the gain of the antenna element and the transmission electric power.

The state detection unit can detect a coupled antenna element positioned in the vicinity of the communication apparatus and having a higher gain than a gain of the antenna element of the communication apparatus, and the control unit can authenticate the coupled antenna element detected by the state detection unit and, in a case where the coupled antenna element is authenticated, can set the threshold value to a value for a state in which a gain of the antenna element is high.

The control unit can further set transmission electric power for a transmission signal to a value for a state in which a gain of the antenna element is high in a case where the coupled antenna element detected by the state detection unit is authenticated.

The state detection unit can acquire a quick response (QR) code (registered trademark) including information relating to the coupled antenna element, and the control unit can authenticate the coupled antenna element by authenticating the QR code (registered trademark) acquired by the state detection unit.

A communication method according to an aspect of the present technology is a communication method by a communication apparatus that performs wireless communication via an antenna element, the communication method including: detecting a state of a gain of the antenna element; controlling a threshold value for carrier sense on the basis of the state of the gain of the antenna element that has been detected; performing the carrier sense and determining whether communication using the threshold value that has been set is possible; and performing wireless communication in a case where it is determined that the communication is possible.

A communication system according to another aspect of the present technology is a communication system including a communication apparatus and an antenna apparatus, in which the antenna apparatus includes: a coupled antenna element excited by a wireless signal from the communication apparatus positioned in the vicinity of the antenna apparatus; and a notification unit that notifies the communication apparatus that the communication apparatus is positioned in the vicinity of the antenna apparatus, and the communication apparatus includes: a detection unit that detects the antenna apparatus positioned in the vicinity of the communication apparatus on the basis of a notification from the notification unit of the antenna apparatus; a control unit that controls a threshold value for carrier sense on the basis of a detection result by the detection unit; a carrier sense unit that performs the carrier sense and determines whether communication using the threshold value set by the control unit is possible; and a communication unit that performs wireless communication in a case where it is determined by the carrier sense unit that the communication is possible.

In the communication apparatus and method according to an aspect of the present technology, a state of a gain of the antenna element is detected, a threshold value for carrier sense is controlled on the basis of the state of the gain of the antenna element that has been detected, the carrier sense is performed to determine whether communication using the threshold value that has been set is possible, and wireless communication is performed in a case where it is determined that the communication is possible.

In the antenna apparatus of the communication system according to another aspect of the present technology, a coupled antenna element is excited by a wireless signal from the communication apparatus positioned in the vicinity of the coupled antenna element, and the communication apparatus is notified of being positioned in the vicinity of that antenna apparatus. In the communication apparatus of this communication system, the antenna apparatus positioned in the vicinity of this communication apparatus is detected on the basis of a notification from the notification unit of the antenna apparatus, a threshold value for carrier sense is controlled on the basis of a detection result of the antenna apparatus, the carrier sense is performed to determine whether communication using the threshold value that has been set is possible, and wireless communication is performed in a case where it is determined that the communication is possible.

Effects of the Invention

According to the present technology, communication can be performed. Additionally, according to the present technology, communication control can be performed according to the gain of the antenna element.

BRIEF DESCRIPTION OF DRAWINGS

FIG. 16 is a diagram illustrating an example of table information indicating a correspondence relationship between a state of a gain and communication control.

FIG. 20 is a block diagram illustrating an exemplary main configuration of a control unit.

MODE FOR CARRYING OUT THE INVENTION

Modes for carrying out the present disclosure (hereinafter, referred to as embodiments) will be described below. Note that the description will be given in the following order.

1. First Embodiment (Position Notification System)
2. Second Embodiment (Transmission Apparatus)
3. Third Embodiment (Anti-Theft System)

1. First Embodiment

<Position Notification System>

Figure 1:
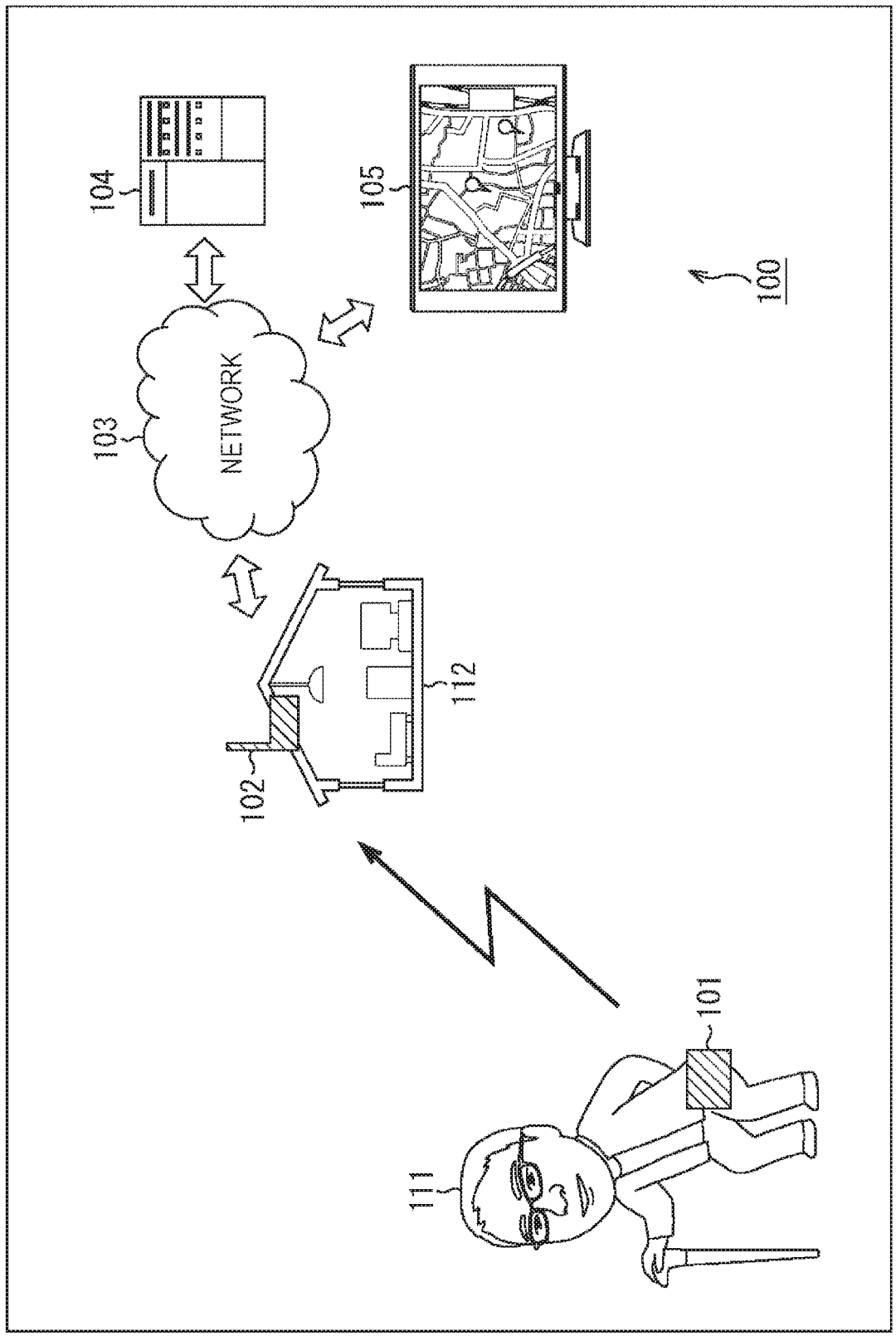
FIG. 1 is a diagram illustrating an exemplary main configuration of a position notification system.

FIG. 1 is a diagram illustrating an exemplary main configuration of a position notification system which is an embodiment of a signal transmission/reception system to which the present technology is applied. The position notification system 100 illustrated in FIG. 1 is a system in which a transmission apparatus 101 notifies its own position.

The transmission apparatus 101 transmits position information indicating its own position as a wireless signal. A high-sensitivity reception apparatus 102 receives this wireless signal to acquire the position information of the transmission apparatus 101 and supplies this position information to a server 104 via a network 103. In other words, the high-sensitivity reception apparatus 102 functions as a relay station that relays the information transmitted from the transmission apparatus 101 to transfer to the server 104. The server 104 manages the position information of each transmission apparatus 101. A terminal apparatus 105 operated by a user who wishes to know the position of the transmission apparatus 101 accesses the server 104 via the network 103 to acquire the position information of the transmission apparatus 101 from the server 104 and, for example, displays the acquired position information together with map data or the like to notify the user of the position of the transmission apparatus 101.

For example, the transmission apparatus 101 is carried by a target person whose position the user wishes to grasp. In the example in FIG. 1, an elderly 111 carries the transmission apparatus 101. The transmission apparatus 101 can find its own position information (for example, latitude and longitude) as necessary by, for example, receiving a global navigation satellite system (GNSS) signal from a GNSS satellite. The transmission apparatus 101 transmits the position information thereon as a wireless signal as necessary. Accordingly, the user can grasp the position of the elderly 111 as a position monitoring target by operating the terminal apparatus 105 as described above.

Note that the target person of position monitoring is arbitrary. For example, the target may be a child or an animal such as a dog or a cat, or may be an employee of a company, or the like. The transmission apparatus 101 may be configured as a dedicated apparatus but, for example, may be built into a portable information processing apparatus such as a mobile phone or a smartphone.

The placement position of the high-sensitivity reception apparatus 102 is arbitrary. For example, the installation position may be a roof, a rooftop space, or the like of a structure 112 such as a building, a condominium, or a house. The structure 112 is suitable because there are a large number of structures in an urban area having a high possibility that a position monitoring target person (for example, the elderly 111) carrying the transmission apparatus 101 is likely to be active and additionally the placement therein is easy. In particular, the home of the position monitoring target person is suitable because the home is more likely to have the possibility that the position monitoring target person is positioned around the home. In addition, in terms of securing the placement location, it is easy and not troublesome to obtain consent in this case, as compared with a case where a provider of this position notification service secures a location to place the high-sensitivity reception apparatus 102 by its own efforts.

Furthermore, for example, in a case where the position monitoring target person (or the user) purchases or borrows the high-sensitivity reception apparatus 102 to place, the load (cost) of the position notification service provider can be further reduced than a case where the position notification service provider places the high-sensitivity reception apparatus 102 by its own efforts. In other words, with such an approach, it is possible to place more high-sensitivity reception apparatuses 102 at a lower cost.

While the transmission apparatus 101 is positioned within the communication coverage of any of the high-sensitivity reception apparatuses 102, the server 104 can manage the position of this transmission apparatus 101. In different words, if the position of the transmission apparatus 101 is out of the communication coverage of any high-sensitivity reception apparatus 102, the server 104 can no longer manage the position thereof. Accordingly, the server 104 can manage the position of the transmission apparatus 101 more accurately as the communication coverage network of the high-sensitivity reception apparatuses 102 for the transmission apparatus 101 is enlarged to a wider range. Here, more accurate management means managing the position of the transmission apparatus 101 in a wider range. In other words, in order to realize a wider range in which the position of the transmission apparatus 101 can be managed, it is more preferable that the transmission apparatus 101 and the high-sensitivity reception apparatus 102 be able to transmit and receive wireless signals farther away from each other (the communication coverage of each high-sensitivity reception apparatus 102 be wider). In addition, since the respective high-sensitivity reception apparatuses 102 are placed at mutually different positions, it is more preferable that a larger number of the high-sensitivity reception apparatuses 102 be employed. Furthermore, taking the usefulness into account, it is preferable to assign an area with a higher possibility that the transmission apparatus 101 is positioned as the communication coverage of the high-sensitivity reception apparatus 102.

Accordingly, as the number of the high-sensitivity reception apparatuses 102 increases, the quality of services that can be provided is enhanced, which is preferable for the position notification system 100. In other words, a more useful system can be implemented at a lower cost.

Note that, as for the placement location, in addition to the above examples, the high-sensitivity reception apparatus 102 may also be placed on a movable object (also referred to as a moving body) such as an automobile, a motorcycle, or a bicycle. In other words, the position of the high-sensitivity reception apparatus 102 may be variable.

The network 103 is an arbitrary communication network and may be a communication network for wired communication or a communication network for wireless communication, or may be constituted by both of the communication networks. In addition, the network 103 may be constituted by one communication network or may be constituted by a plurality of communication networks. Communication networks and communication paths conforming to any communication standards may be included in the network 103, examples of which are the Internet, a public telephone line network, a wide area communication network for a wireless moving body, such as a so-called 3G line or a 4G line, a wireless communication network for performing communication compliant with a wide area network (WAN), local area network (LAN), or Bluetooth (registered trademark) standard, a communication path for short-range wireless communication, such as the near field communication (NFC), a communication path for infrared communication, and a communication network for wired communication compliant with a standard such as the high-definition multimedia interface (HDMI) (registered trademark), the universal serial bus (USB), or the like.

The server 104 and the terminal apparatus 105 are information processing apparatuses that process information. The server 104 and the terminal apparatus 105 are communicably connected to the network 103 and can communicate with another communication apparatus connected to the network 103 via this network 103 to exchange information.

Figure 2:
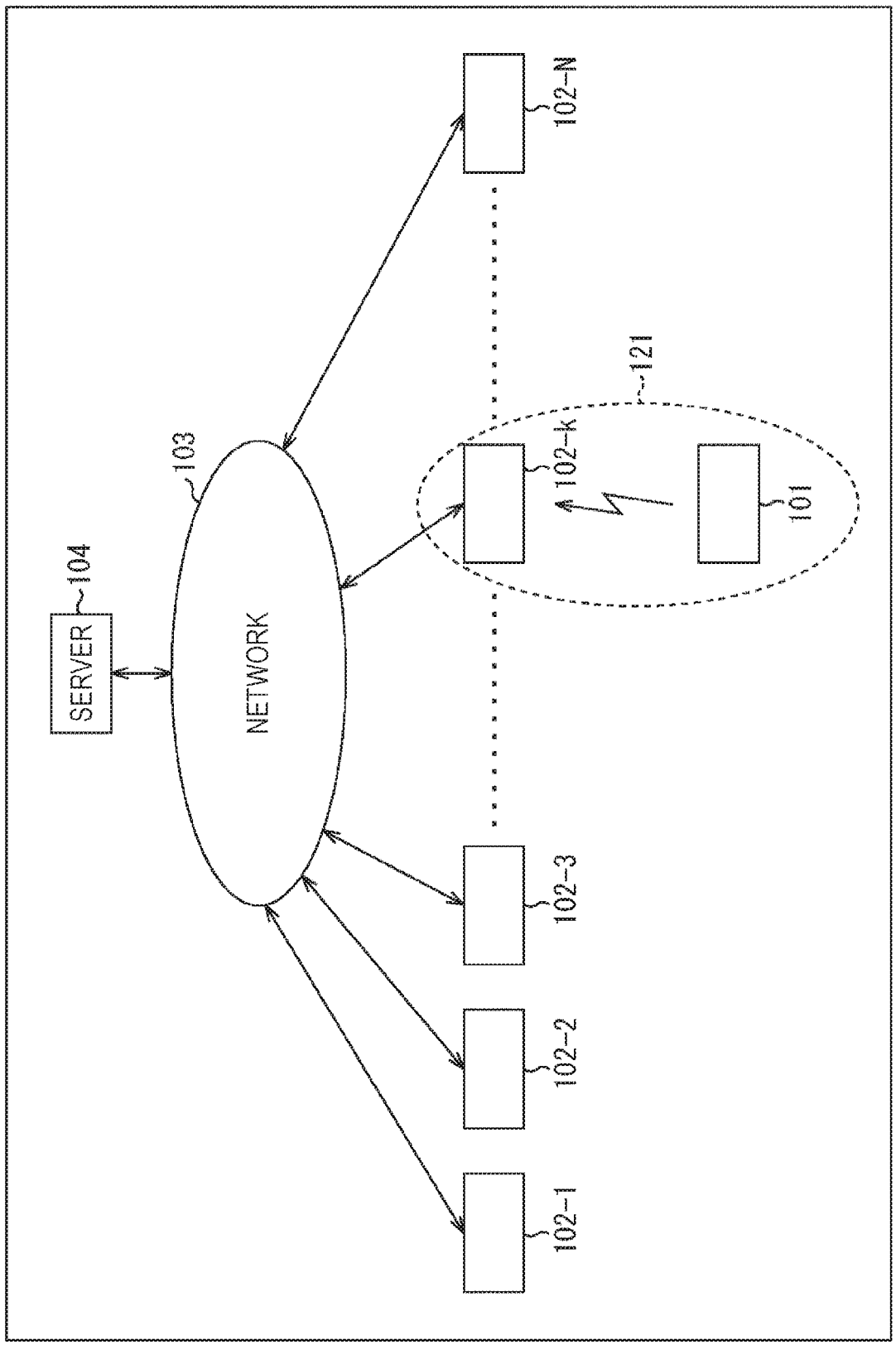
FIG. 2 is a diagram for explaining an example of how a position is notified.

In such a position notification system 100, the number of the transmission apparatuses 101, the high-sensitivity reception apparatuses 102, the servers 104, and the terminal apparatuses 105 is arbitrary and any member may be plural. For example, as illustrated in FIG. 2, it is assumed that the position notification system 100 has N (N is an arbitrary natural number) high-sensitivity reception apparatuses 102 placed at mutually different positions (a high-sensitivity reception apparatus 102-1 to a high-sensitivity reception apparatus 102-N).

The timing at which the transmission apparatus 101 transmits the wireless signal (position information) is arbitrary. For example, the transmission apparatus 101 may periodically transmit the wireless signal or may transmit the wireless signal at the occurrence of a predetermined event (for example, in a case where the transmission apparatus 101 moves by a predetermined distance or predetermined time has come).

In this case, the wireless signal transmitted from the transmission apparatus 101 is received by the high-sensitivity reception apparatus 102 positioned near the transmission apparatus 101. When the transmission apparatus 101 transmits a wireless signal from within a communication coverage 121 of the high-sensitivity reception apparatus 102-K (K is an integer of $1 \leq K \leq N$), the high-sensitivity reception apparatus 102-K receives this wireless signal to acquire the position information of the transmission apparatus 101 and supplies this position information to the server 104 via the network 103 (relays the position information).

For example, when the elderly 111 (transmission apparatus 101) moves to within the communication coverage of another high-sensitivity reception apparatus 102 and the transmission apparatus 101 transmits a wireless signal, the another high-sensitivity reception apparatus 102 similarly relays the position information. Accordingly, as long as the elderly 111 (the transmission apparatus 101) is positioned within the communication coverage of any of the high-sensitivity reception apparatuses 102, the user can grasp the position of the elderly 111.

The server 104 manages the position information of the transmission apparatus 101. In a case where there is a plurality of transmission apparatuses 101, the server 104 manages the position information thereon for each transmission apparatus 101. For example, the transmission apparatus 101 transmits its own identification information (ID) together with the position information. The server 104 stores this position information in association with the ID of the transmission apparatus 101 to manage. Accordingly, the server 104 can provide only the position information of the transmission apparatus 101 requested from the user (terminal apparatus 105). Note that the server 104 can also manage users for whom the provision of the position information is permitted, for each transmission apparatus 101. In other words, the server 104 can provide the position information of each transmission apparatus 101 only to a user who is permitted to acquire the position information of a specific transmission apparatus 101.

Note that the server 104 may manage the position information of the transmission apparatus 101 in association with another type of information other than the ID of the transmission apparatus 101. For example, the server 104 may store the position information of the transmission apparatus 101 in association with time information or the like to manage. By configuring in this manner, the server 104 can manage the history of the position information of the transmission apparatus 101 to provide.

Note that such time information may be transmitted from the transmission apparatus 101. For example, the transmission apparatus 101 may transmit the time information included in the GNSS signal as a wireless signal together with the position information.

In addition, the position information transmitted by the transmission apparatus 101 can be any information as long as the information can be managed in the server 104 as information indicating the position of the transmission apparatus 101 and its content is arbitrary. For example, the transmission apparatus 101 may transmit the GNSS signal (or the time information included in the GNSS signal) without finding the position information from the GNSS signal. In that case, the high-sensitivity reception apparatus 102 or the server 104 or the like may find the position information of the transmission apparatus 101 using the GNSS signal or the time information. In addition, an information processing apparatus (server or the like) for finding the position information of the transmission apparatus 101 using such a GNSS signal or time information may be separately provided.

Alternatively, for example, the position of the transmission apparatus 101 may be found on the basis of the placement position of the high-sensitivity reception apparatus 102 that receives the wireless signal from the transmission apparatus 101. For example, in the case of FIG. 2, the transmission apparatus 101 is positioned within the communication coverage 121 of the high-sensitivity reception apparatus 102. In such a case, the server 104 may estimate that the transmission apparatus 101 is positioned within the communication coverage 121 of the high-sensitivity reception apparatus 102-K as a result of relaying by the high-sensitivity reception apparatus 102-K and manage the fact to that effect as the position information. In other words, in this case, the position of the transmission apparatus 101 is managed with the granularity of the number of the high-sensitivity reception apparatuses 102 (the size of the communication coverage of each high-sensitivity reception apparatus 102). In this case, the transmission apparatus 101 is only required to transmit at least its own ID as a wireless signal.

In addition, for example, a distance between the high-sensitivity reception apparatus 102 and the transmission apparatus 101 may be estimated from the radio wave strength of the wireless signal received by the high-sensitivity reception apparatus 102, or the like, such that the server 104 also manages this distance as the position information. In other words, the server 104 may manage which high-sensitivity reception apparatus 102 has the communication coverage within which the transmission apparatus 101 is positioned and what distance is there between these high-sensitivity reception apparatus 102 and transmission apparatus 101. This estimation of distance may be made in the high-sensitivity reception apparatus 102 or the server 104, or may be made by a dedicated information processing apparatus (a server or the like) provided separately.

Furthermore, for example, in a case where the transmission apparatus 101 is positioned at a portion where the communication coverages of a plurality of high-sensitivity reception apparatuses 102 overlap, that is, in a case where the wireless signal transmitted by the transmission apparatus 101 is relayed by a plurality of high-sensitivity reception apparatuses 102, the position of the transmission apparatus 101 may be estimated using trigonometry or the like. This estimation of position may be made, for example, in the server 104 or may be made by a dedicated information processing apparatus (a server or the like) provided separately.

Each of the high-sensitivity reception apparatuses 102 may be enabled to relay information regarding an arbitrary transmission apparatus 101 or may be enabled to relay only information regarding the transmission apparatus 101 corresponding to the relevant high-sensitivity reception apparatus 102. For example, only the high-sensitivity reception apparatus 102 owned or managed by an owner (or a manager) of a certain transmission apparatus 101 may be enabled to relay information transmitted from the certain transmission apparatus 101. This owner (or the manager) may include not only individuals but also businesses. By configuring in this manner, it is possible to avoid sharing the high-sensitivity reception apparatus 102 by a plurality of users, such that a reduction in communication security, such as information leakage, for example, can be suppressed. In addition, the number of usable high-sensitivity reception apparatuses 102 may be set according to the amount of fee paid by the user. This makes it possible to achieve the differentiation of quality of services to be provided depending on considerations.

<Use Forms of Transmission Apparatus>

Figure 3:
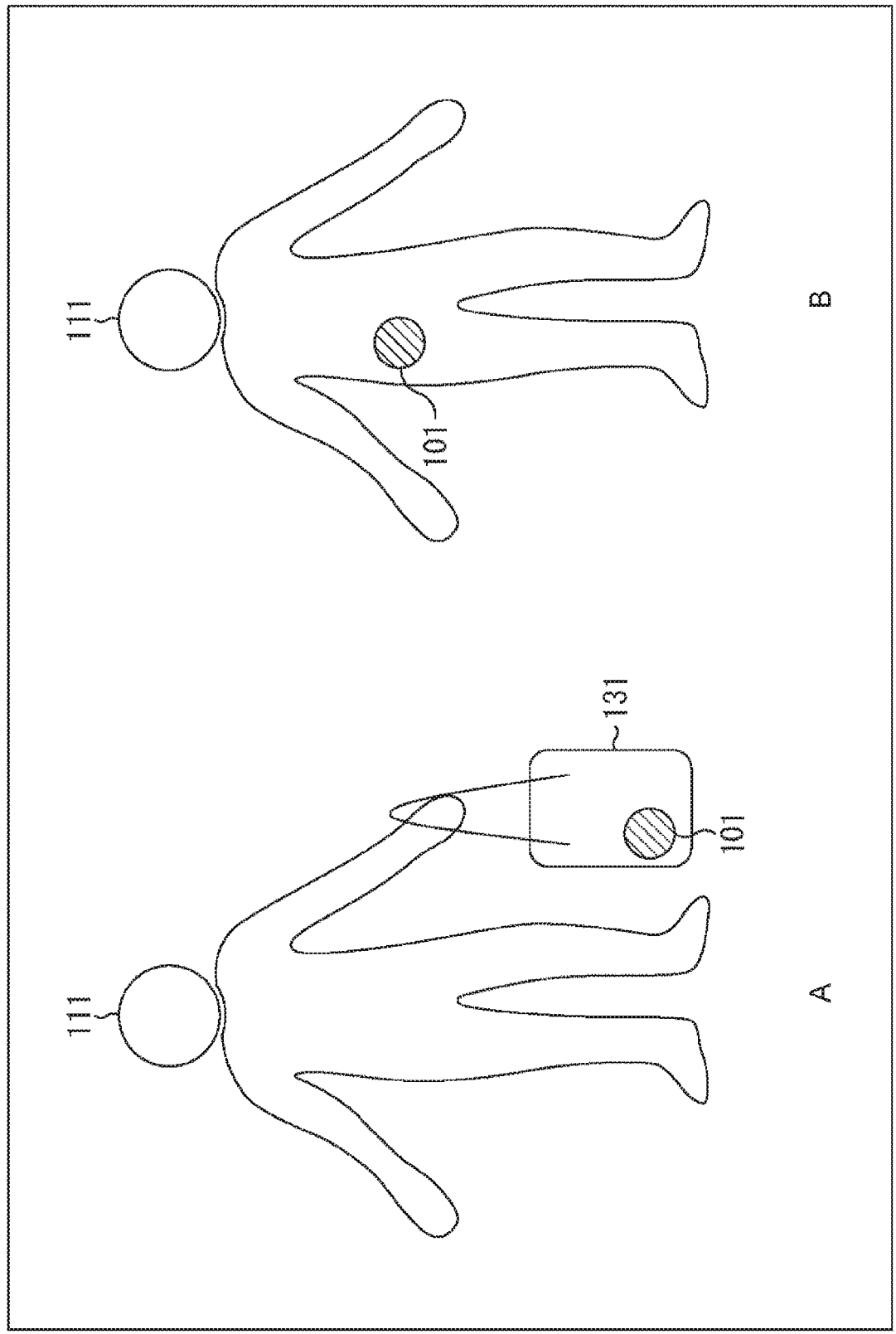
FIG. 3 is a diagram illustrating an example of a use form of a transmission apparatus.

In the position notification system 100 as described above, the elderly 111 puts the transmission apparatus 101 in a bag 131 to carry, as illustrated in A of FIG. 3 as an example. In this case, the transmission apparatus 101 is apart from the human body of the elderly 111 and the radiation characteristics of the wireless signal are not easily affected by the human body.

However, this transmission apparatus 101 is so compact that, as illustrated in B of FIG. 3 as an example, the elderly 111 also can put the transmission apparatus 101 in a pocket to carry. In such a case, since the transmission apparatus 101 is positioned in the vicinity of the human body, the radiation characteristics of the wireless signal are greatly affected by the human body to fluctuate. Therefore, there has been a fear that the communication characteristics of the transmission apparatus 101 are reduced.

<Jacket Type Communication System>

Thus, in order to improve the radiation characteristics of the wireless signal and suppress a reduction in communication characteristics even in the vicinity of the human body, an auxiliary antenna is brought in proximity to the transmission apparatus 101.

Figure 4:
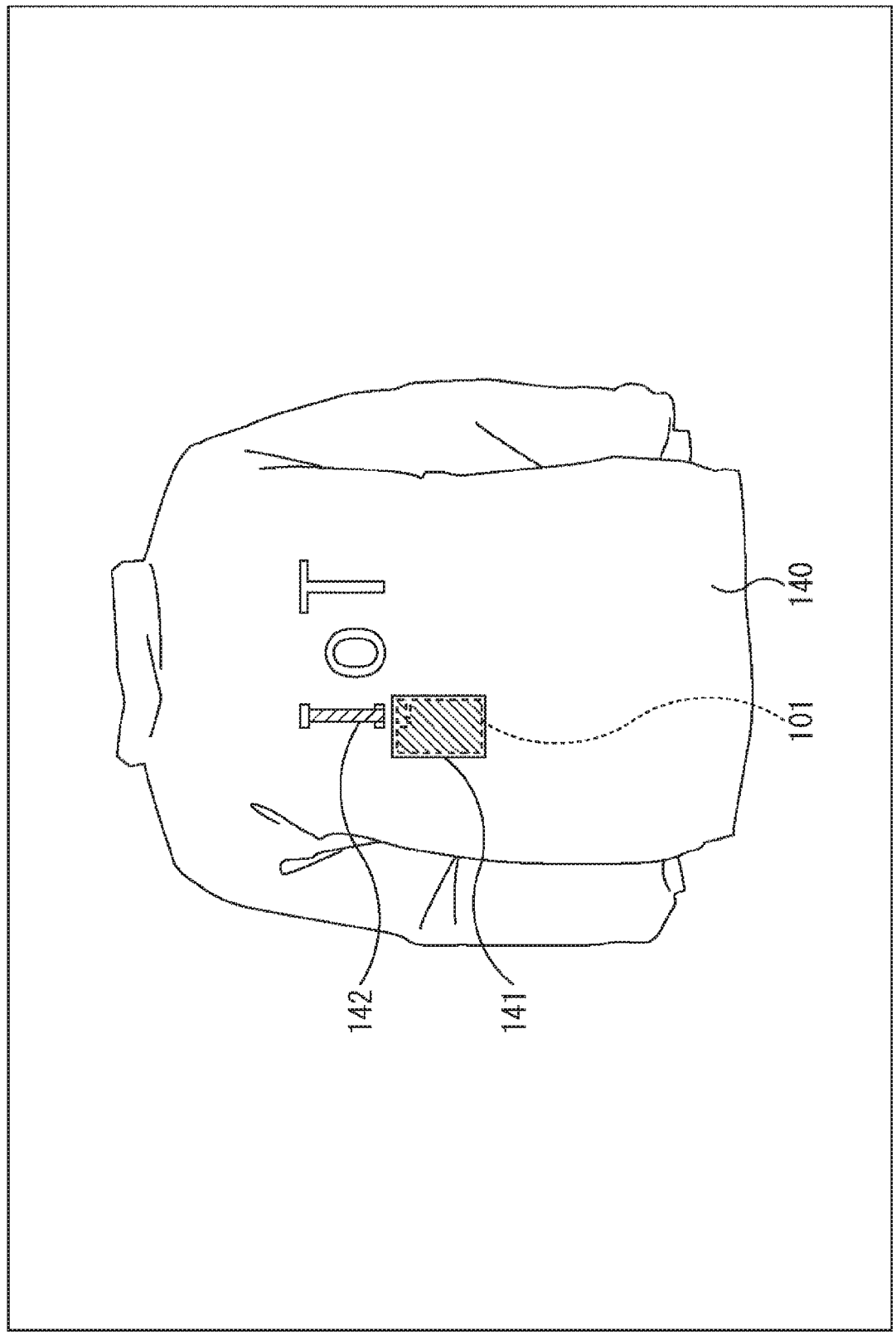
FIG. 4 is a diagram illustrating an exemplary main configuration of a jacket.

For example, a jacket 140 in FIG. 4 has a pocket 141 in which the transmission apparatus 101 can be retained and an antenna apparatus 142 provided at a position in the vicinity of the transmission apparatus 101 put in that pocket 141 to function as the auxiliary antenna as mentioned above. This transmission apparatus 101 put in the pocket 141 transmits a wireless signal using the antenna apparatus 142. In other words, the jacket 140 has a communication system constituted by the transmission apparatus 101 put in the pocket 141 and the antenna apparatus 142 to transmit a wireless signal.

Note that the antenna apparatus 142 may be formed so as to be a part of a picture (logo, message, letter, symbol, and the like) depicted on the jacket 140 as in the example in FIG. 4 such that the visual recognition of the antenna apparatus 142 is suppressed (in other words, the antenna apparatus 142 is inconspicuous). In the case of the example in FIG. 4, the antenna apparatus 142 is attached to a vertical line portion of "I" of the character string "IoT" depicted on a back portion of the jacket 140 (a portion with upper left to lower right shading in FIG. 4). Then, the pocket 141 is provided on the jacket 140 at such a location that the transmission apparatus 101 (an antenna 151 described later) in an accommodated state within that pocket 141 of the jacket 140 is positioned in the vicinity of an end portion of the above antenna apparatus 142 (a coupled antenna element 161 described later) (for example, below the letter "I").

In addition, this antenna apparatus 142 may be formed on a front side of the jacket 140 (that is, so as to be exposed) or a rear side of the jacket 140, or may be formed between a plurality of stacked fabrics (for example, between an outer material and a lining material).

Furthermore, the pocket 141 and the antenna apparatus 142 may be formed at an arbitrary position on the jacket 140 as long as the positional relationship between the pocket 141 and the antenna apparatus 142 is as described above.

<Transmission Apparatus>

Figure 5:
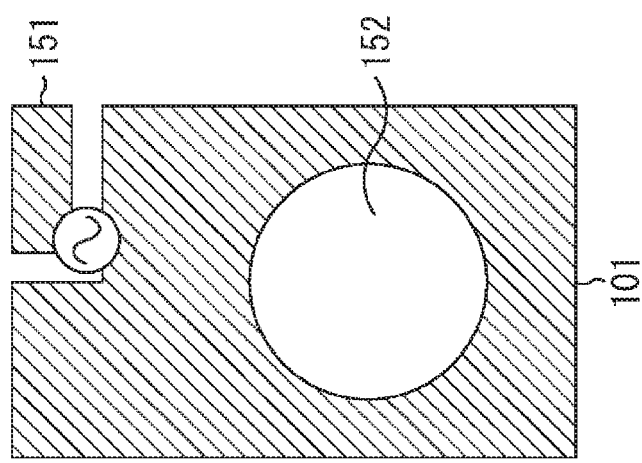
FIG. 5 is a diagram illustrating an exemplary main configuration of the transmission apparatus.

FIG. 5 is a diagram illustrating an exemplary main configuration of the transmission apparatus 101. As illustrated in FIG. 5, the transmission apparatus 101 has the compact antenna element 151 on an end portion thereof. For example, in a case where the transmission apparatus 101 transmits a wireless signal alone, the antenna element 151 functions as a radiating element that transmits a wireless signal. Meanwhile, for example, in a case where the transmission apparatus 101 transmits a wireless signal using the antenna apparatus 142, the antenna element 151 functions as an exciter that excites the antenna apparatus 142 functioning as an auxiliary antenna.

The transmission apparatus 101 may be enabled to transmit a wireless signal compliant with any communication standard. For example, the transmission apparatus 101 may transmit a wireless signal by a method capable of long-distance communication using a frequency zone including 925 MHz (also referred to as 920-MHz zone) This 920-MHz zone (for example, a frequency band of 920 MHz to 930 MHz) is a frequency zone released from July 2011 by the Ministry of Internal Affairs and Communications and can be used by anyone without a license. However, the maximum continuous transmission time is restricted to four seconds by the provision (Association of Radio Industries and Businesses (ARIB) STD T-108). If the continuous transmission time is further shortened to, for example, 0.2 seconds, more channels can be allocated and it is possible to perform transmission and reception with less interference.

Thus, in a case where the transmission apparatus 101 uses such a 920-MHz zone, one transmission of data may be performed in units of a super frame of a predetermined time. The length of this predetermined time is arbitrary. For example, 30 seconds or five minutes may be adopted. A frame of 0.192 seconds is repeated up to 100 times at the maximum within this predetermined time. That is, since the continuous transmission time is less than 0.2 seconds, many transmission channels can be allocated to this transmission. As a result, relatively free channels can be selected for transmission and a more robust system against interference can be constructed.

In addition, a gap x between frames is a time of at least 2 ms or more. In the case of using the 920-MHz zone in Japan, carrier sense must be performed to confirm whether communication is being performed in a specific band before signal transmission. Then, only in a case where the band is free, the signal can be transmitted. Accordingly, 920 MHz cannot be used at any time. Consequently, the gap x may be different each time depending on the result of carrier sense (that is, how crowded the channel is). When 30 seconds are averaged, frames are configured to be transmitted at a rate of once every about 0.3 seconds. As a result, 100 frames are transmitted within the predetermined time of the super frame. The number of frames that can be transmitted somewhat fluctuates depending on the degree of congestion of the channel. Although the signal transmitted in 100 frames is arbitrary, when the same frame is repeatedly transmitted, the signal-to-noise (S/N) ratio can be enhanced by integrating the same frame in the high-sensitivity reception apparatus 102, whereby reception with higher sensitivity is enabled. In other words, communication of a longer distance becomes possible.

In addition, the transmission apparatus 101 has a magnetic material 152. This magnetic material 152 is used to fix the transmission apparatus 101 in the vicinity of the antenna apparatus 142. This magnetic material 152 may be provided inside a cabinet of the transmission apparatus 101, or may be partially or entirely exposed. By providing the magnetic body 152 inside the cabinet of the transmission apparatus 101, the occurrence of aged deterioration, damage, and the like can be suppressed.

<Antenna Apparatus>

Figure 6:
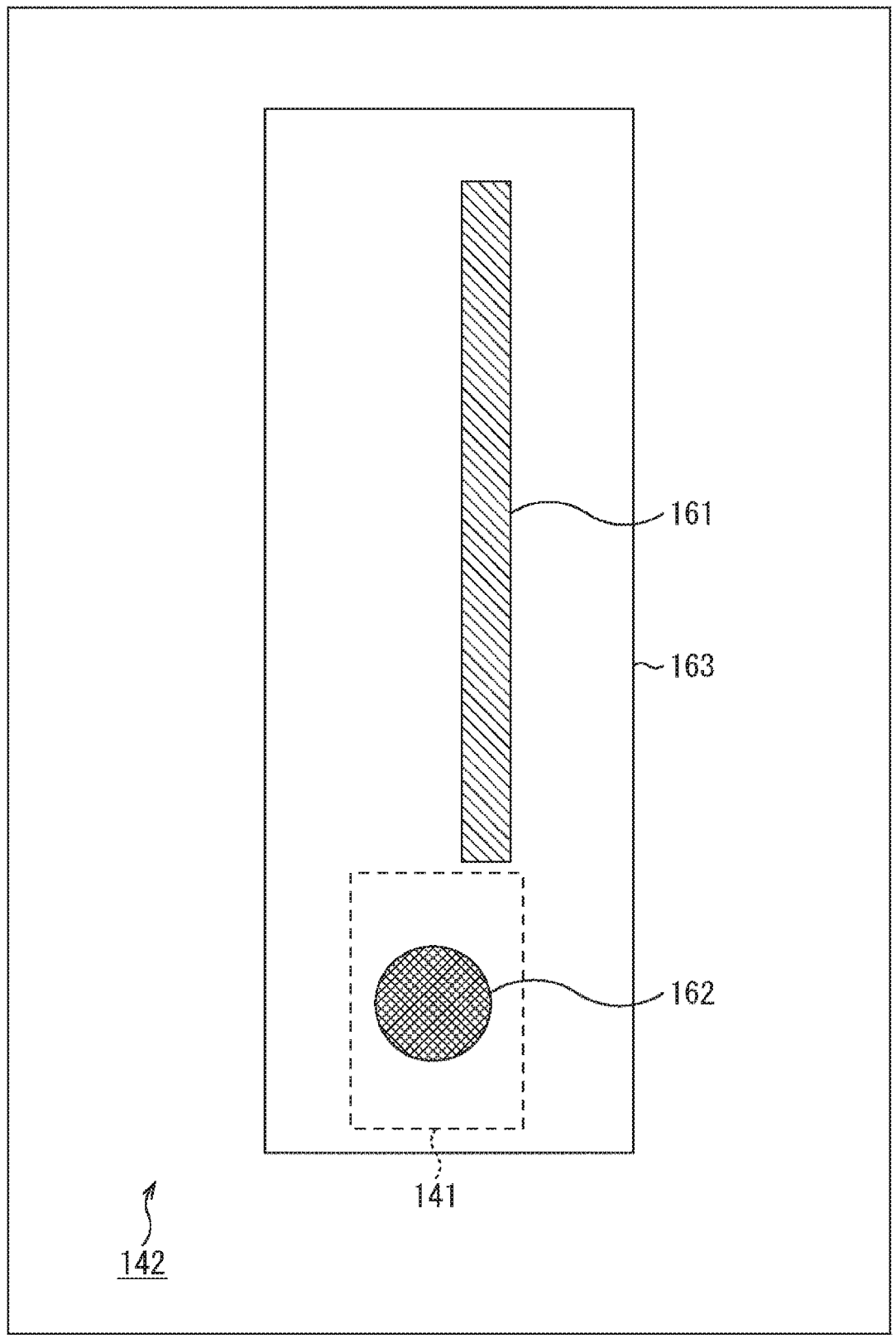
FIG. 6 is a diagram illustrating an exemplary main configuration of an antenna apparatus.

FIG. 6 is a diagram illustrating an exemplary main configuration of the antenna apparatus 142. As illustrated in FIG. 6, the antenna apparatus 142 has the coupled antenna element 161 and a magnet 162.

The coupled antenna element 161 is a parasitic antenna element which functions as an auxiliary antenna of the transmission apparatus 101. The coupled antenna element 161 is provided on the jacket 140 at such a position that an end portion of the coupled antenna element 161 is in the vicinity of the transmission apparatus 101 retained in the pocket 141. Note that, in the present description, the term "vicinity" includes both a state of contact (touch position) and a state of non-contact (slightly-apart position). In other words, the coupled antenna element 161 may be in contact with the transmission apparatus 101 (the antenna element 151 thereof) or may be in non-contact therewith. By laying out the coupled antenna element 161 in non-contact therewith, it is possible to suppress the occurrence of aged deterioration, damage, and the like in the coupled antenna element 161 and the transmission apparatus 101.

The coupled antenna element 161 is excited by the antenna element 151 of the transmission apparatus 101. This coupled antenna element 161 is formed in such a manner that the electrical length thereof in a longitudinal direction is longer than the electrical length of the antenna element 151 of the transmission apparatus 101 in a longitudinal direction. For example, the electrical length of the coupled antenna element 161 in the longitudinal direction may be approximately a half wavelength of the wireless signal transmitted by the transmission apparatus 101. By configuring in this manner, it is possible to increase the output of the wireless signal to be transmitted and to suppress a reduction in communication characteristics.

The coupled antenna element 161 is formed using a conductor such as metal, for example. The material and shape of the coupled antenna element 161 are arbitrary as long as the material and shape function as an antenna element. The coupled antenna element 161 may be constituted by a plurality of members. For example, the coupled antenna element 161 may be obtained by weaving conductive fibers (conductive yarns) into a net shape (cloth). Alternatively, for example, the coupled antenna element 161 may be a conductive tape or nonwoven fabric. In addition, the coupled antenna element 161 may be constituted by a plurality of types of materials. Note that electric power may be supplied to the coupled antenna element 161.

Figure 7:
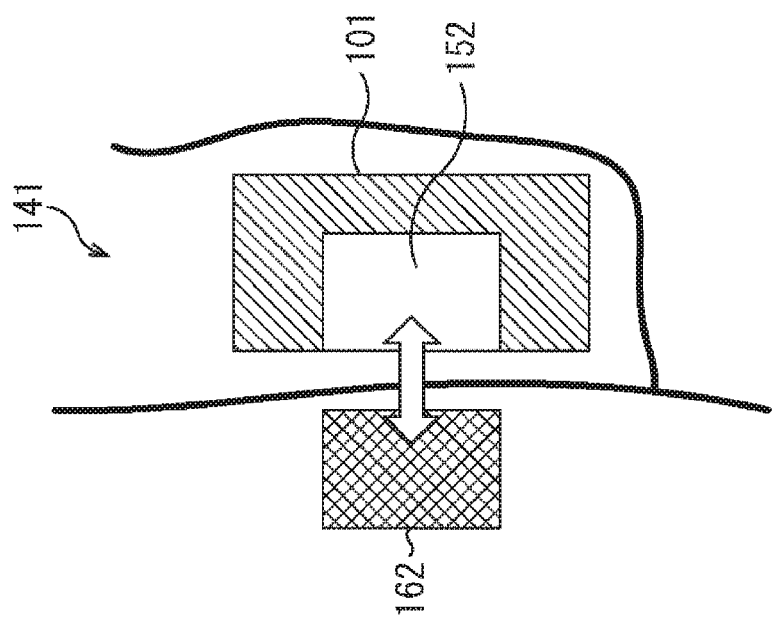
FIG. 7 is a diagram for explaining an example of how a position is fixed.

The magnet 162 is provided on the antenna apparatus 142 at a portion positioned at the pocket 141. The magnet 162 is used to fix the position of the transmission apparatus 101 retained in the pocket 141, as illustrated in FIG. 7 as an example. In other words, the magnet 162 of the antenna apparatus 142 and the magnetic material 152 of the transmission apparatus 101 attract each other, whereby the position of the transmission apparatus 101 is fixed at a predetermined position within the pocket 141 (in the vicinity of the antenna apparatus 142).

Figure 8:
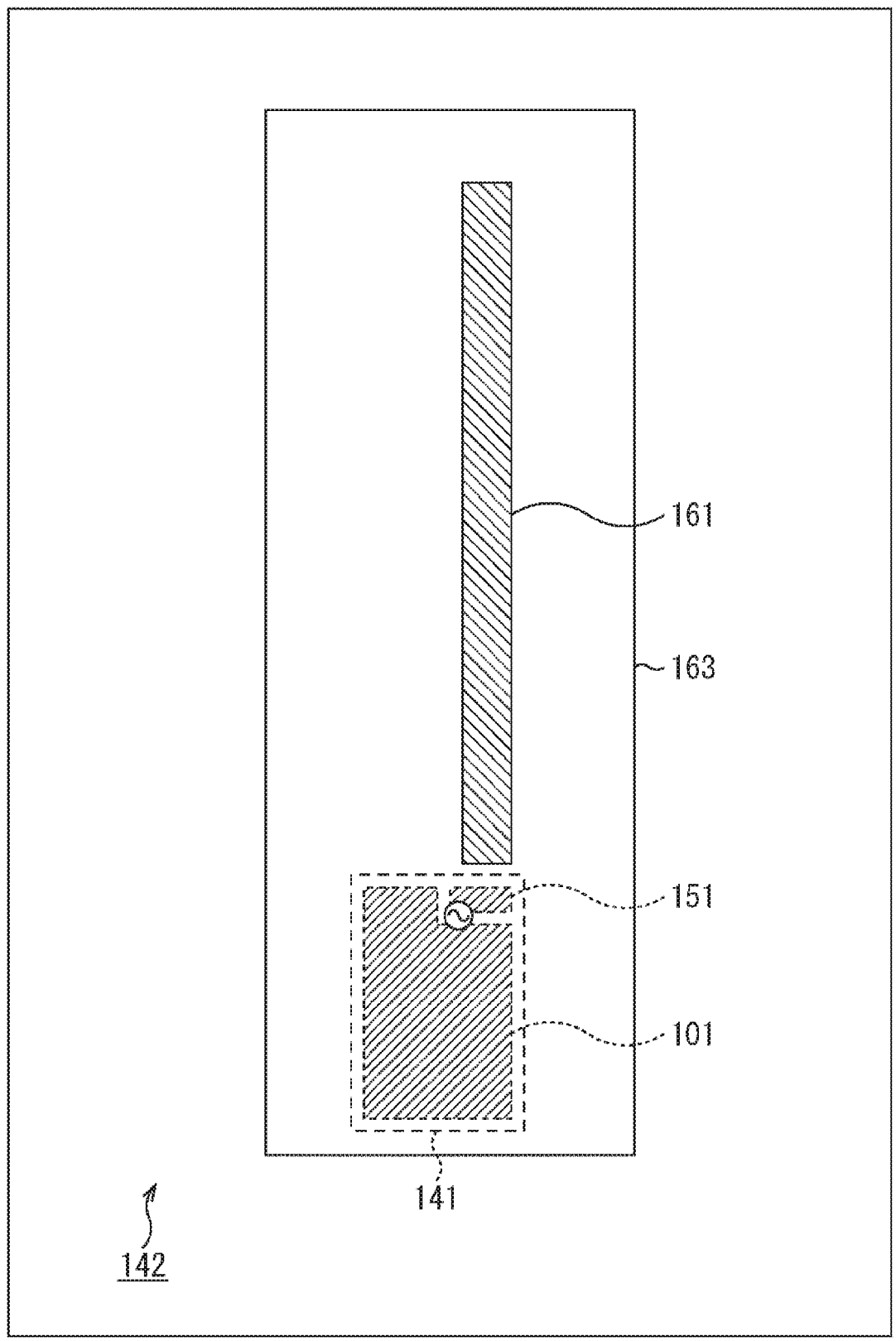
FIG. 8 is a diagram illustrating an example of how the transmission apparatus and the antenna apparatus are brought in proximity to each other.
Figure 9:
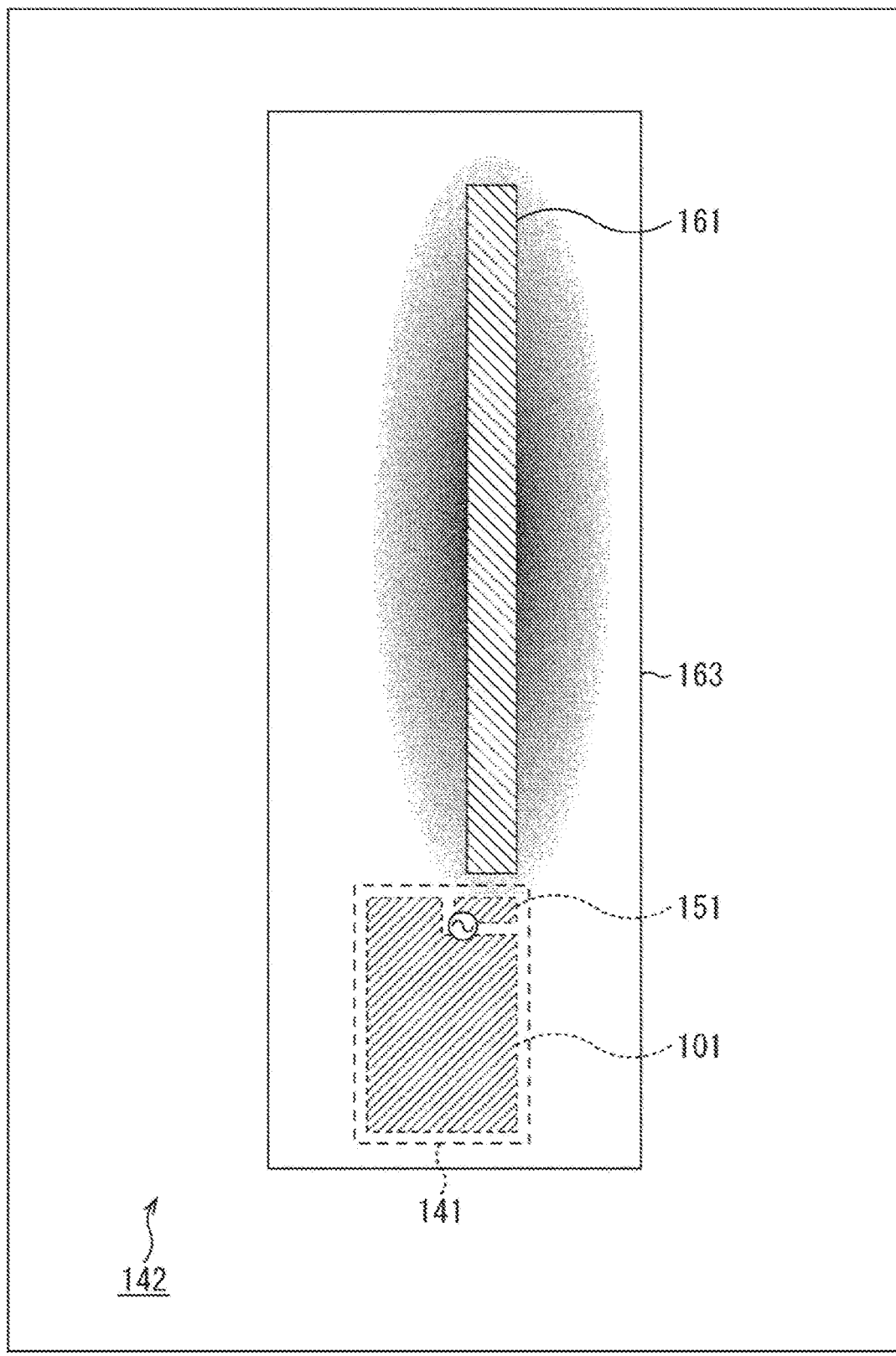
FIG. 9 is a diagram illustrating an example of radiation characteristics.

FIG. 8 is a diagram illustrating an example of how this state is brought about. In the case of this example, the transmission apparatus 101 is fixed inside the pocket 141 such that the antenna element 151 thereof is positioned in the vicinity of the end portion of the coupled antenna element 161. This allows the antenna element 151 to excite the coupled antenna element 161. Then, as illustrated in FIG. 9, excellent radiation characteristics can be obtained in the coupled antenna element 161 by such excitation. This makes it possible to suppress a reduction in communication characteristics of the transmission apparatus 101.

When the position is fixed as described above, the magnet 162 may be brought into contact with the transmission apparatus 101, or may be in non-contact therewith as in the example in FIG. 8. By fixing the position in non-contact, the occurrence of aged deterioration, damage, and the like can be suppressed.

Returning to FIG. 6, a reflection plate 163 may be further formed between the transmission apparatus 101 and the coupled antenna element 161, and the human body to cover the transmission apparatus 101 and the coupled antenna element 161 from the human body. By configuring in this manner, it is possible to suppress the influence of the human body on the wireless communication by the transmission apparatus 101 and the coupled antenna element 161. The reflection plate 163 may be formed using a conductor such as metal, for example. The material and shape of the reflection plate 163 are arbitrary. For example, the reflection plate 163 may be constituted by a plurality of members. For example, the reflection plate 163 may be obtained by weaving conductive fibers (conductive yarns) into a net shape. In addition, the reflection plate 163 may be constituted by a plurality of materials.

<Other Working Examples>

Figure 10:
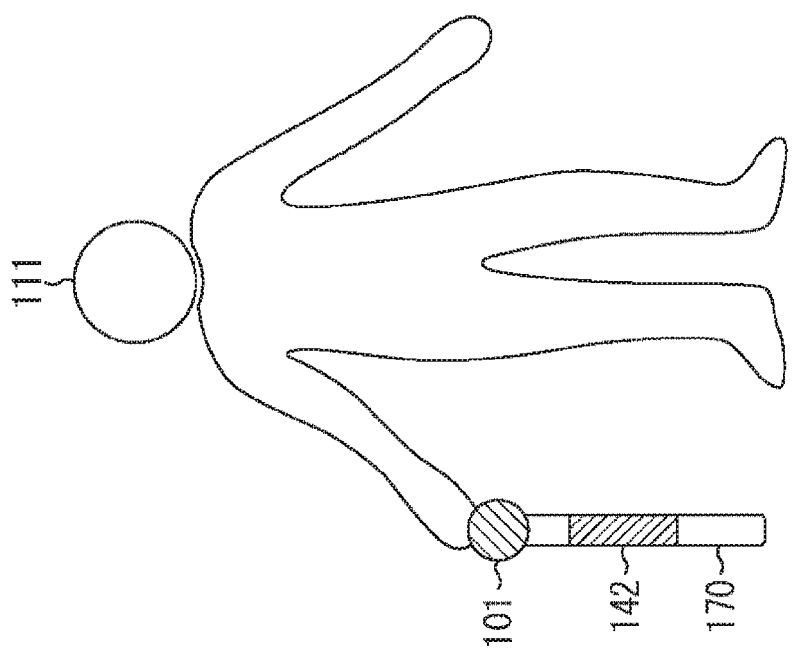
FIG. 10 is a diagram illustrating an example of a stick.

While the above description has explained that a communication system including the transmission apparatus 101 and the antenna apparatus 142 is implemented as the jacket 140, a device that implements such a communication system may be of any type. For example, as illustrated in FIG. 10, the communication system may be implemented as a stick 170. For example, the transmission apparatus 101 may be allowed to be attached to a grip of the stick 170 held by the elderly 111 such that the antenna apparatus 142 is formed in a portion of a shaft in the vicinity of this grip. Besides, for example, it becomes easier to observe the position of the elderly 111 by implementing the above-described communication system as a device which is easy for the elderly 111 (a target whose position is to be observed) to carry, such as a bag or a hat.

<Configuration of Each Device>

Figure 11:
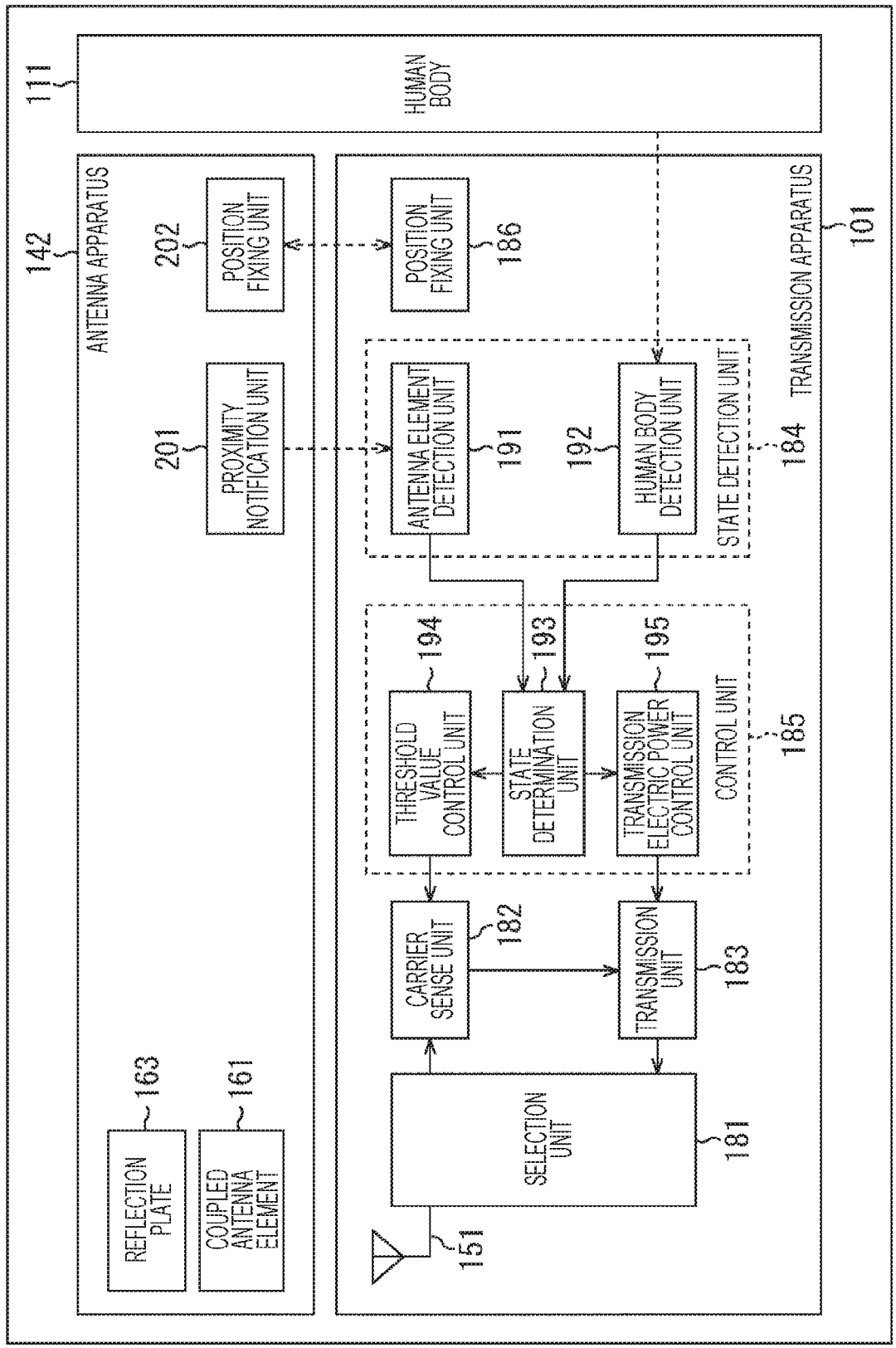
FIG. 11 is a block diagram illustrating an exemplary main configuration of the transmission apparatus.

FIG. 11 is a block diagram illustrating an exemplary main configuration inside the transmission apparatus 101 and the antenna apparatus 142. As illustrated in FIG. 11, the transmission apparatus 101 has a selection unit 181, a carrier sense unit 182, a transmission unit 183, a state detection unit 184, a control unit 185, and a position fixing unit 186 in addition to the antenna element 151.

The selection unit 181 selects one of the carrier sense unit 182 and the transmission unit 183 as a connection destination of the antenna element 151. For example, in a case where the carrier sense unit 182 performs carrier sense, the selection unit 181 connects the antenna element 151 to the carrier sense unit 182. Meanwhile, for example, in a case where a transmission signal is transmitted, the selection unit 181 connects the antenna element 151 to the transmission unit 183.

The carrier sense unit 182 performs a process relating to carrier sense that confirms whether communication is being performed in a band in which a transmission signal is to be transmitted (also referred to as band of interest). For example, the carrier sense unit 182 receives a signal that acts as a disturbance wave in the band of interest (a signal other than the transmission signal transmitted by the transmission unit 183) to compare this reception signal with a predetermined threshold value and determines whether the communication is being performed in that band. Then, the carrier sense unit 182 supplies control information involving a result of the determination to the transmission unit 183. For example, in a case where it is determined that communication is being performed, the carrier sense unit 182 controls the transmission unit 183 to stop transmission. Meanwhile, for example, in a case where it is determined that communication is not being performed, the carrier sense unit 182 controls the transmission unit 183 to perform transmission.

The transmission unit 183 performs a process relating to transmission. The transmission unit 183 generates a transmission signal and, in a case where the transmission is permitted by the carrier sense unit 182, supplies this transmission signal to the antenna element 151 via the selection unit 181 to cause this transmission signal to radiate from this antenna element 151 (that is, cause this antenna element 151 to transmit the transmission signal as a wireless signal). Note that the contents and specifications of this transmission signal are arbitrary. For example, the transmission unit 183 may receive the GNSS signal to find current position information of the transmission apparatus 101 using this GNSS signal and generate a transmission signal including this position information.

The state detection unit 184 performs a process relating to the detection of the state of the gain of the antenna element. The state detection unit 184 has an antenna element detection unit 191 and a human body detection unit 192.

The antenna element detection unit 191 detects the antenna apparatus 142 (coupled antenna element 161) positioned in the vicinity of the transmission apparatus 101. For example, the antenna element detection unit 191 may have a sensor that detects a change in an environment around the transmission apparatus 101, or the like. For example, the antenna element detection unit 191 may have a magnetic sensor such as a Hall element. In addition, for example, the antenna element detection unit 191 may have a switch that shifts the connection in a circuit inside the transmission apparatus 101 on the basis of a change in an environment around the transmission apparatus 101, or the like. For example, the antenna element detection unit 191 may have a magnet switch or a magnetization switch (reed switch) that shifts the connection according to a change in a magnetic field. Furthermore, for example, the antenna element detection unit 191 may have a mechanical switch that shifts the connection by being physically pressed by a cabinet of the antenna apparatus 142, or the like.

As a matter of course, the parameter of the surrounding environment in which the antenna element detection unit 191 detects a change is arbitrary and may be a parameter other than the magnetic field (magnetism). For example, the parameter may be light, brightness, sound, capacitance (electric field), voltage, current, vibration, force, pressure, temperature, humidity, chemical substance, odor, or the like. In addition, the antenna element detection unit 191 may detect changes in a plurality of types of parameters. Furthermore, priority may be given to these parameters or weighting may be applied thereto. The antenna element detection unit 191 supplies information indicating this detection result to the control unit 185.

The human body detection unit 192 detects a human body (for example, the elderly 111) positioned in the vicinity of the transmission apparatus 101. For example, the human body detection unit 192 may have a sensor that detects a change in an environment around the transmission apparatus 101, or the like. For example, the human body detection unit 192 may have a capacitive sensor that detects a change in capacitance, an ultrasonic sensor that detects the presence of an object by a reflected wave of an ultrasonic wave, an infrared sensor that detects a change in infrared light, a brightness sensor that detects a change in brightness, an image sensor that detects a change in an image, and the like. In addition, for example, the human body detection unit 192 may have a switch that shifts the connection in a circuit inside the transmission apparatus 101 on the basis of a change in an environment around the transmission apparatus 101, or the like. For example, the human body detection unit 192 may have a mechanical switch that is pressed by a human body or the like brought in proximity to the transmission apparatus 101.

As a matter of course, the parameter of the surrounding environment in which the human body detection unit 192 detects a change is arbitrary and, for example, the parameter may be light, brightness, sound, capacitance (electric field), voltage, current, vibration, force, pressure, temperature, humidity, chemical substance, odor, or the like. In addition, the human body detection unit 192 may detect changes in a plurality of types of parameters. Furthermore, priority may be given to these parameters or weighting may be applied thereto. The human body detection unit 192 supplies information indicating this detection result to the control unit 185.

The control unit 185 performs a process relating to the control of communication. The control unit 185 has, for example, a state determination unit 193, a threshold value control unit 194, and a transmission electric power control unit 195.

The state determination unit 193 performs a process relating to the determination of the state of the gain of the antenna element. For example, the state determination unit 193 determines the state of the gain of the antenna element on the basis of the detection result of the antenna apparatus 142 (coupled antenna element 161) supplied from the antenna element detection unit 191. In addition, for example, the state determination unit 193 determines the state of the gain of the antenna element on the basis of the detection result of the human body of the elderly 111 supplied from the human body detection unit 192. Furthermore, for example, the state determination unit 193 determines the state of the gain of the antenna element on the basis of both of the detection results. The state determination unit 193 supplies this determination result to the threshold value control unit 194, the transmission electric power control unit 195, or the both.

The threshold value control unit 194 sets a threshold value for carrier sense on the basis of information indicating the state of the gain of the antenna element supplied from the state determination unit 193. In other words, the threshold value control unit 194 controls the threshold value for carrier sense on the basis of the state of the gain of the antenna element determined by the state determination unit 193. The threshold value control unit 194 supplies information indicating the set threshold value to the carrier sense unit 182. The carrier sense unit 182 compares the signal level of the reception signal in the band of interest obtained by carrier sense with this threshold value to determine whether communication is being performed in this band.

The transmission electric power control unit 195 sets output electric power (transmission electric power) for the transmission signal on the basis of information indicating the state of the gain of the antenna element supplied from the state determination unit 193. In other words, the transmission electric power control unit 195 controls the transmission electric power on the basis of the state of the gain of the antenna element determined by the state determination unit 193. The transmission electric power control unit 195 supplies information indicating the set transmission electric power to the transmission unit 183. The transmission unit 183 transmits the transmission signal with the magnitude of this transmission electric power.

The position fixing unit 186 fixes the relative position between the antenna apparatus 142 and the transmission apparatus 101. For example, the position fixing unit 186 cooperates with a position fixing unit 202 of the antenna apparatus 142 to fix each other, thereby fixing the relative position between the antenna apparatus 142 and the transmission apparatus 101. The position fixing unit 186 may be constituted by any type. In other words, the relative position may be fixed by any method. For example, the position fixing unit 186 may have the magnetic material 152 as in FIG. 5 such that the relative position is fixed using magnetic force, or the position fixing unit 186 may have a physical shape such as concave and convex shapes such that the relative position is fixed by fitting, screwing, or the like using this shape.

Meanwhile, as illustrated in FIG. 11, the antenna apparatus 142 has a proximity notification unit 201 and the position fixing unit 202 in addition to the coupled antenna element 161 and the reflection plate 163.

The proximity notification unit 201 notifies the transmission apparatus 101 positioned in the vicinity of the antenna apparatus 142 (brought in proximity to the antenna apparatus 142) of the fact to that effect. For example, in the case of FIG. 6, the proximity notification unit 201 is constituted by the magnet 162. In other words, the magnet 162 uses the magnetic field to notify the transmission apparatus 101 that the transmission apparatus 101 has been brought in proximity to the antenna apparatus 142.

The notification made by the proximity notification unit 201 is detected by the antenna element detection unit 191 of the transmission apparatus 101. In other words, the proximity notification unit 201 makes a notification by a method corresponding to a method of detection by the antenna element detection unit 191. In different words, as long as a notification is made by a method corresponding to a method of detection by the antenna element detection unit 191, the proximity notification unit 201 may have any configuration and may notify the transmission apparatus 101 by any method that the transmission apparatus 101 has been brought in proximity to the antenna apparatus 142.

For example, the proximity notification unit 201 may change a parameter such as light, brightness, sound, capacitance (electric field), voltage, current, vibration, force, pressure, temperature, humidity, chemical substance, or odor such that the antenna element detection unit 191 detects a change therein. Alternatively, for example, the proximity notification unit 201 may have a physical shape such as a convex portion (for example, may be configured as a part or the whole of the cabinet of the antenna apparatus 142) so as to press the antenna element detection unit 191 including a mechanical switch with this physical shape and shift the connection. In addition, the proximity notification unit 201 may change a plurality of types of parameters.

The position fixing unit 202 fixes the relative position between the antenna apparatus 142 and the transmission apparatus 101. For example, the position fixing unit 202 cooperates with the position fixing unit 186 of the transmission apparatus 101 to fix each other, thereby fixing the relative position between the antenna apparatus 142 and the transmission apparatus 101. The position fixing unit 202 may be constituted by any type as long as the configuration thereof corresponds to the configuration of the position fixing unit 186. In other words, the relative position may be fixed by any method. For example, the position fixing unit 202 may have the magnet 162 as in FIG. 6 such that the relative position is fixed using magnetic force, or the position fixing unit 202 may have a physical shape such as concave and convex shapes corresponding to the position fixing unit 186 such that the relative position is fixed by fitting, screwing, or the like using this shape.

Note that the magnet 162 in FIG. 6 can function as both the proximity notification unit 201 and the position fixing unit 202 as described above. In this manner, one device may serve as the proximity notification unit 201 and the position fixing unit 202 (these two functions may be implemented by one device).

<Change in Threshold Value for Carrier Sense by Gain>

Figure 12:
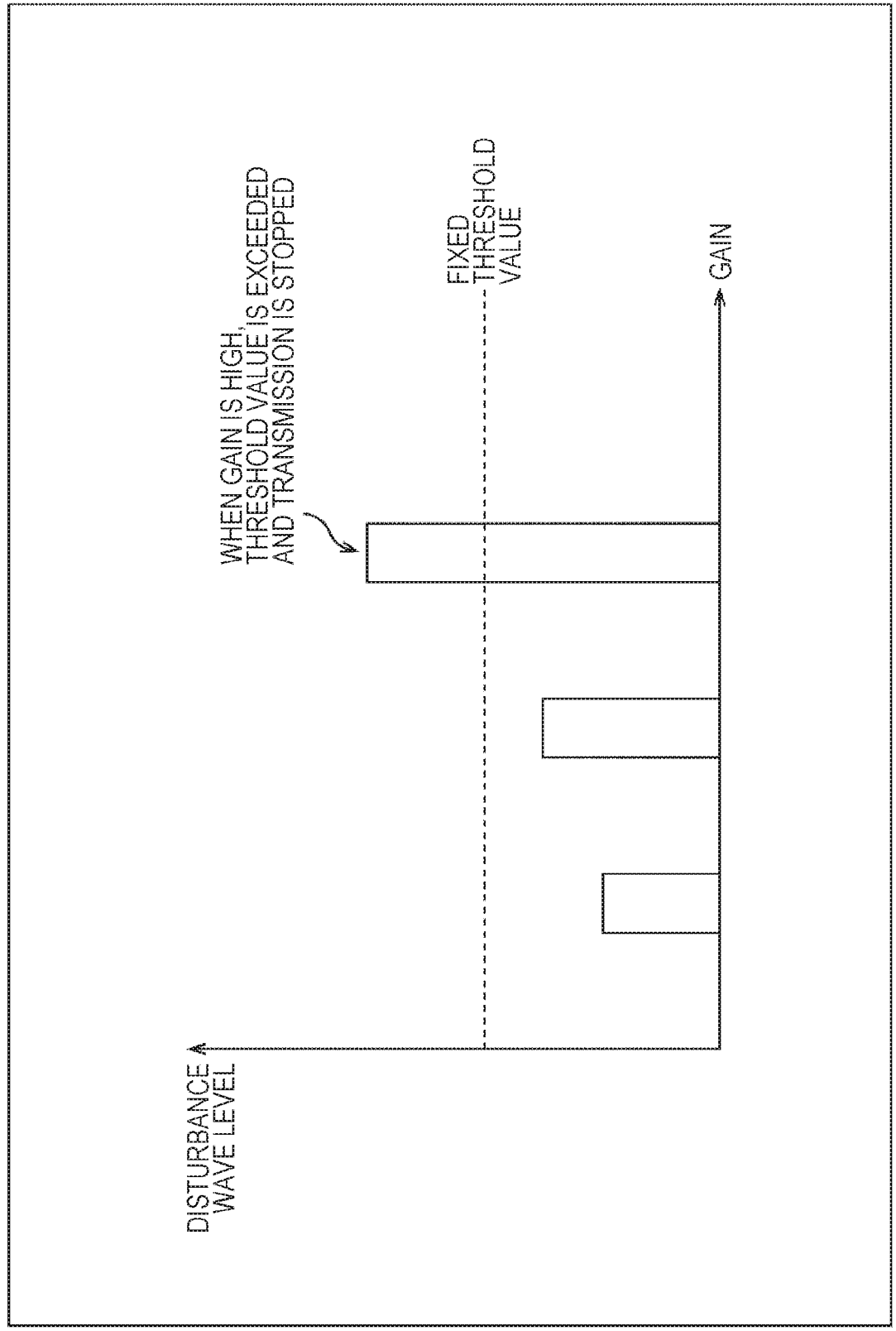
FIG. 12 is a diagram for explaining an example of how transmission control based on a disturbance wave level is performed.

Incidentally, a signal (disturbance wave) is received when carrier sense is performed, but the magnitude of this reception signal (disturbance wave level) changes depending on the gain of the antenna element to be used. For example, as illustrated in FIG. 12, even with the same reception signal (disturbance wave), the disturbance wave level becomes smaller as indicated by a bar graph on the left side in FIG. 12 when the gain of the antenna element is low, while the disturbance wave level becomes moderate as indicated by a bar graph in the middle of FIG. 12 when the gain of the antenna element is medium and the disturbance wave level becomes larger as indicated by a bar graph on the right in FIG. 12 when the gain of the antenna element is high. On the other hand, when the threshold value for carrier sense is a fixed value, the higher the gain of the antenna element, the more easily the disturbance wave level exceeds the threshold value. For example, assuming that the threshold value is set so as to be a proper value in a state in which the gain of the antenna element is low, when this threshold value is used in a state in which the gain of the antenna element is high, a disturbance wave level to the extent that the disturbance wave level becomes equal to or lower than the threshold value and the transmission is permitted while the gain of the antenna element is low becomes equal to or higher than the threshold value, causing a fear that the transmission is to be stopped. In other words, many disturbance wave levels unnecessarily become equal to or higher than the threshold value and there has been a fear of improper communication control such as excessively stopping the transmission.

<Change in Transmission Electric Power by Gain>

In addition, as the gain of the antenna element becomes higher, for example, the signal level of the wireless signal transmitted from the antenna element becomes larger. In different words, assuming that this signal level of the wireless signal is constant, the output electric power (transmission electric power) for the transmission signal by the transmission unit 183 can be smaller as the gain of the antenna element becomes higher. As this output electric power is made smaller, the power consumption can be reduced. The transmission apparatus 101 is a device carried by the elderly 111 and is driven by a finite electric power source such as a battery, rather than being driven with a power source supplied from the outside. Accordingly, the lower the power consumption, the longer the driving time of the transmission apparatus 101 can be.

<Use Forms of Transmission Apparatus>

Incidentally, as described earlier, the transmission apparatus 101 can be used alone and also can be used in combination with the antenna apparatus 142. In a case where the transmission apparatus 101 is used alone, only the antenna element 151 works as an antenna element used for transmitting the transmission signal. On the other hand, in a case where the transmission apparatus 101 is used in combination with the antenna apparatus 142, a combination of the coupled antenna element 161 and the antenna element 151 works as an antenna element used for transmitting the transmission signal. As described with reference to FIGS. 4 to 9, the coupled antenna element 161 is larger (longer) than the antenna element 151 and the gain thereof is higher than that of the antenna element 151. In other words, the gain of the antenna element changes depending on whether the transmission apparatus 101 is used alone or in combination with the antenna apparatus 142. In addition, when the transmission apparatus 101 (antenna element 151) is used in the vicinity of a human body, the radiation characteristics of the antenna element 151 decline due to the influence of the human body and the gain may be reduced.

Figure 13:
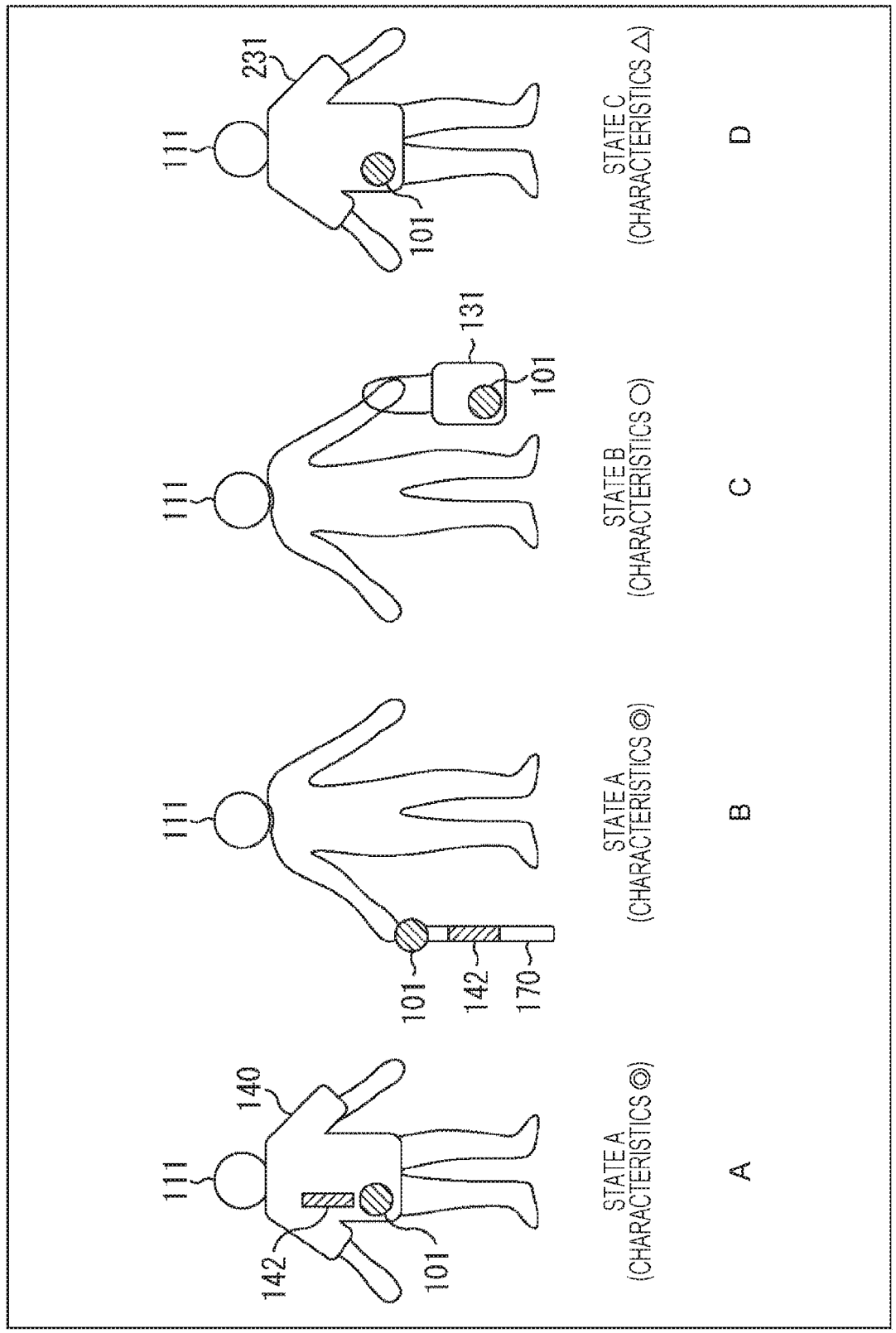
FIG. 13 is a diagram illustrating an example of use forms of the transmission apparatus.

A more specific example will be described. FIG. 13 is a diagram illustrating an example of use forms of the transmission apparatus 101. In the case of the example in A of FIG. 13, the transmission apparatus 101 is attached to the jacket 140 worn by the elderly 111. In this case, the transmission apparatus 101 is brought in proximity to the antenna apparatus 142 and used in combination with the antenna apparatus 142. Accordingly, the gain of the antenna element becomes high (◉ as described above. In the case of the example in B of FIG. 13, the transmission apparatus 101 is attached to the stick 170 used by the elderly 111. Also in this case, the transmission apparatus 101 is brought in proximity to the antenna apparatus 142 and used in combination with the antenna apparatus 142. Accordingly, the gain of the antenna element becomes high (◉ as described above.

On the other hand, in the case of the example in C of FIG. 13, the transmission apparatus 101 is accommodated in the bag 131 carried by the elderly 111. In this case, the transmission apparatus 101 is used alone. However, the transmission apparatus 101 is used apart from the human body of the elderly 111. Accordingly, the gain of the antenna element becomes lower (o) than in the cases of A and B of FIG. 13. In addition, in the case of the example in D of FIG. 13, the transmission apparatus 101 is accommodated in the pocket of an outerwear 231 worn by the elderly 111. Also in this case, the transmission apparatus 101 is used alone. Additionally, the transmission apparatus 101 is used while being in proximity to the human body of the elderly 111. Accordingly, the gain of the antenna element becomes lower (Δ) than in the case of C of FIG. 13.

<Communication Control According to Gain>

In this manner, the gain of the antenna element changes depending on the use form of the transmission apparatus 101. Thus, the control unit 185 specifies the use form of the transmission apparatus 101 on the basis of the detection result by the state detection unit 184 and determines the state of the gain of the antenna element from this use form to perform communication control according to the state. This makes it possible to implement more proper communication control under more diverse environments.

For example, the threshold value for carrier sense is made variable, the state detection unit 184 detects the state of the gain of the antenna element, and the control unit 185 controls the threshold value for carrier sense as communication control on the basis of the detected state of the gain of the antenna element. For example, the control unit 185 can make the threshold value larger as the gain of the antenna element becomes higher. By configuring in this manner, the carrier sense unit 182 can perform carrier sense using a threshold value according to the gain of the antenna element. In other words, the carrier sense unit 182 can properly determine the magnitude of the disturbance wave level regardless of the magnitude of the gain of the antenna element and suppress the occurrence of improper communication control such as excessive transmission stop.

In addition, for example, the transmission electric power by the transmission unit 183 is made variable, the state detection unit 184 detects the state of the gain of the antenna element, and the control unit 185 controls the transmission electric power as communication control on the basis of the detected state of the gain of the antenna element. For example, the control unit 185 can make the transmission electric power smaller as the gain of the antenna element becomes higher. By configuring in this manner, the transmission unit 183 can output the transmission signal with transmission electric power according to the gain of the antenna element. In other words, since the transmission unit 183 can radiate the wireless signal from the antenna element at a constant signal level regardless of the magnitude of the gain of the antenna element, the communication characteristics of the transmission apparatus 101 can be stabilized. In addition, unnecessary increase in power consumption can be suppressed.

<Flow of Transmission Process>

An exemplary flow of a transmission process executed when the transmission apparatus 101 transmits a wireless signal will be described with reference to a flowchart in FIG. 14.

When the transmission process is started, the state detection unit 184 detects the state of the gain in step S101. For example, the state detection unit 184 detects an antenna element (antenna apparatus 142) positioned in the vicinity of the transmission apparatus 101 and detects a human body (elderly 111) positioned in the vicinity of the transmission apparatus 101.

In step S102, the control unit 185 performs a control process to set the threshold value for carrier sense and the transmission electric power according to the magnitude of the gain of the antenna element detected in step S101.

In step S103, the carrier sense unit 182 performs carrier sense using the threshold value set in step S102.

In step S104, the transmission unit 183 determines whether a signal can be transmitted on the basis of a result of the carrier sense in step S103. In a case where it is determined that the signal can be transmitted, the process proceeds to step S105.

In step S105, the transmission unit 183 transmits the transmission signal with the transmission electric power set in step S102. Once the process in step S105 is terminated, the transmission process is terminated.

Meanwhile, in a case where it is determined in step S104 that another communication is still being performed in the band of interest and transmission is impossible, the process in step S105 is omitted and the transmission process is terminated.

Note that this transmission process may be repeated periodically or irregularly.

<Flow of Control Process>

Next, an exemplary flow of the control process performed in step S102 of FIG. 14 will be described with reference to a flowchart in FIG. 15.

When the control process is started, the state determination unit 193 determines in step S121 whether an antenna has been detected in the vicinity of the transmission apparatus 101. In a case where it is determined that an antenna has been detected by the process in step S101 of FIG. 14, the process proceeds to step S122.

In step S122, the threshold value control unit 194 sets the threshold value for carrier sense to the value of a state A in which the gain is high. In step S123, the transmission electric power control unit 195 sets the transmission electric power to the value of the state A in which the gain is high. Once the process in step S123 is terminated, the control process is terminated and the process returns to FIG. 14.

Meanwhile, in a case where it is determined in step S121 that an antenna has not been detected in the vicinity of the transmission apparatus 101, the process proceeds to step S124. In this step S124, the state determination unit 193 determines whether a human body has been detected in the vicinity of the transmission apparatus 101. In a case where it is determined that a human body has been detected, the process proceeds to step S125.

In step S125, the threshold value control unit 194 sets the threshold value for carrier sense to the value of a state C in which the gain is low. In step S126, the transmission electric power control unit 195 sets the transmission electric power to the value of the state C in which the gain is low. Once the process in step S126 is terminated, the control process is terminated and the process returns to FIG. 14.

Meanwhile, in a case where it is determined in step S124 that a human body has not been detected in the vicinity of the transmission apparatus 101, the process proceeds to step S127.

In step S127, the threshold value control unit 194 sets the threshold value for carrier sense to the value of a state B in which the gain is medium. In step S128, the transmission electric power control unit 195 sets the transmission electric power to the value of the state B in which the gain is medium. Once the process in step S128 is terminated, the control process is terminated and the process returns to FIG. 14.

A method of finding the threshold value and the transmission electric power corresponding to each state of the states A to C is arbitrary. For example, the control unit 185 may use table information indicating the correspondence relationships between the state of the gain of the antenna element and the threshold value and the transmission electric power, such as the chart illustrated in FIG. 16, to find the threshold value and the transmission electric power corresponding to each state. By setting the threshold value and the transmission electric power using such table information, the control unit 185 can more easily set the threshold value and the transmission electric power from the state of the gain.

By performing each process as described above, the control unit 185 can perform communication control according to the gain of the antenna element and can implement more proper communication control under more diverse environments.

Note that the above description has explained that the threshold value for carrier sense and the transmission electric power are controlled as an example of communication control, but communication control performed according to the gain of the antenna element is arbitrary and may be of any type. In addition, the number of parameters to be controlled is also arbitrary and, for example, three or more parameters may be controlled according to the gain of the antenna element.

Furthermore, the above description has explained that the gain of the antenna element (proper threshold value and transmission electric power for a specific gain) is obvious (registered) in advance for each use form of the transmission apparatus 101, but the gain of the antenna apparatus may be unknown. In that case, the control unit 185 may find the gain of the antenna element to be used and set proper threshold value and transmission electric power for that gain.

2. Second Embodiment

<Authentication of Antenna Apparatus>

If the gain of the antenna apparatus 142 (coupled antenna element 161) is obvious in advance, as described in the first embodiment, proper threshold value and transmission electric power according to that gain can be registered in advance as table information, such that it is possible to more easily set the threshold value and the transmission electric power. However, in a case where the gain of the antenna apparatus 142 (coupled antenna element 161) is unknown, there is a fear that it becomes difficult to set proper threshold value and transmission electric power according to a specific gain. For example, in a case where the table information is used to set the threshold value and the transmission electric power according to the gain as described above, there has been a fear that the threshold value and the transmission electric power are set to values improper for the gain when the transmission apparatus 101 is used in combination with an antenna apparatus whose gain is unknown.

Thus, in a case where the transmission apparatus 101 is used in combination with the antenna apparatus 142, the transmission apparatus 101 may authenticate the antenna apparatus 142.

Figure 17:
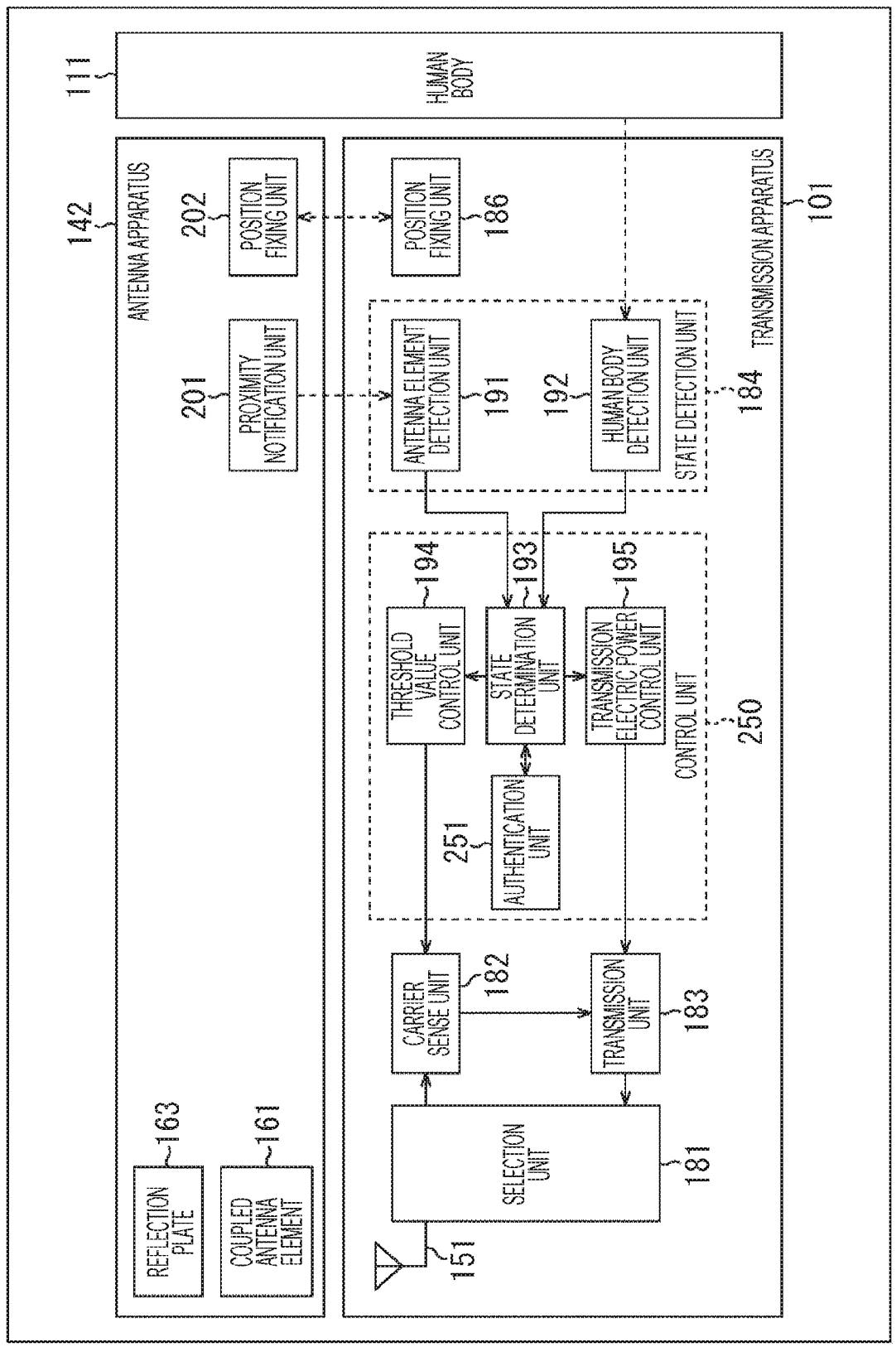
FIG. 17 is a block diagram illustrating an exemplary main configuration of a transmission apparatus.

FIG. 17 illustrates an exemplary main configuration of the transmission apparatus 101 in that case. In this case, the transmission apparatus 101 has a control unit 250 instead of the control unit 185. The control unit 250 is basically a processing unit similar to the control unit 185 and has a configuration similar to the control unit 185, but further has an authentication unit 251.

The authentication unit 251 authenticates the antenna apparatus 142 brought in proximity to the transmission apparatus 101. In other words, the authentication unit 251 determines whether the antenna apparatus 142 brought in proximity to the transmission apparatus 101 is an antenna apparatus whose gain is known. The authentication unit 251 may perform this authentication using any type of information by any method. For example, the antenna element detection unit 191 may acquire information relating to the antenna apparatus 142 from the antenna apparatus 142 (proximity notification unit 201) brought in proximity and supply this information relating to the antenna apparatus 142 to the authentication unit 251 via the state determination unit 193 such that the authentication unit 251 authenticates the antenna apparatus 142 on the basis of this information relating to the antenna apparatus 142.

This information relating to the antenna apparatus 142 is arbitrary. For example, identification information and a password of the antenna apparatus 142 may be included. In addition, for example, a certificate by a third party organization, information relating to the performance of the antenna apparatus 142, or the like may be included.

Furthermore, this information relating to the antenna apparatus 142 may be provided as a quick response (QR) code (registered trademark). For example, a QR code (registered trademark) for information relating to the antenna apparatus 142 may be displayed on the cabinet of the antenna apparatus 142 (may be printed or a seal may be affixed, for example) such that the antenna element detection unit 191 images this QR code (registered trademark) with an image sensor or the like to acquire. As a matter of course, the information relating to the antenna apparatus 142 may be provided as arbitrary information other than the QR code (registered trademark), such as a bar code, magnetic information, or an electric signal, for example.

<Flow of Control Process>

Figure 18:
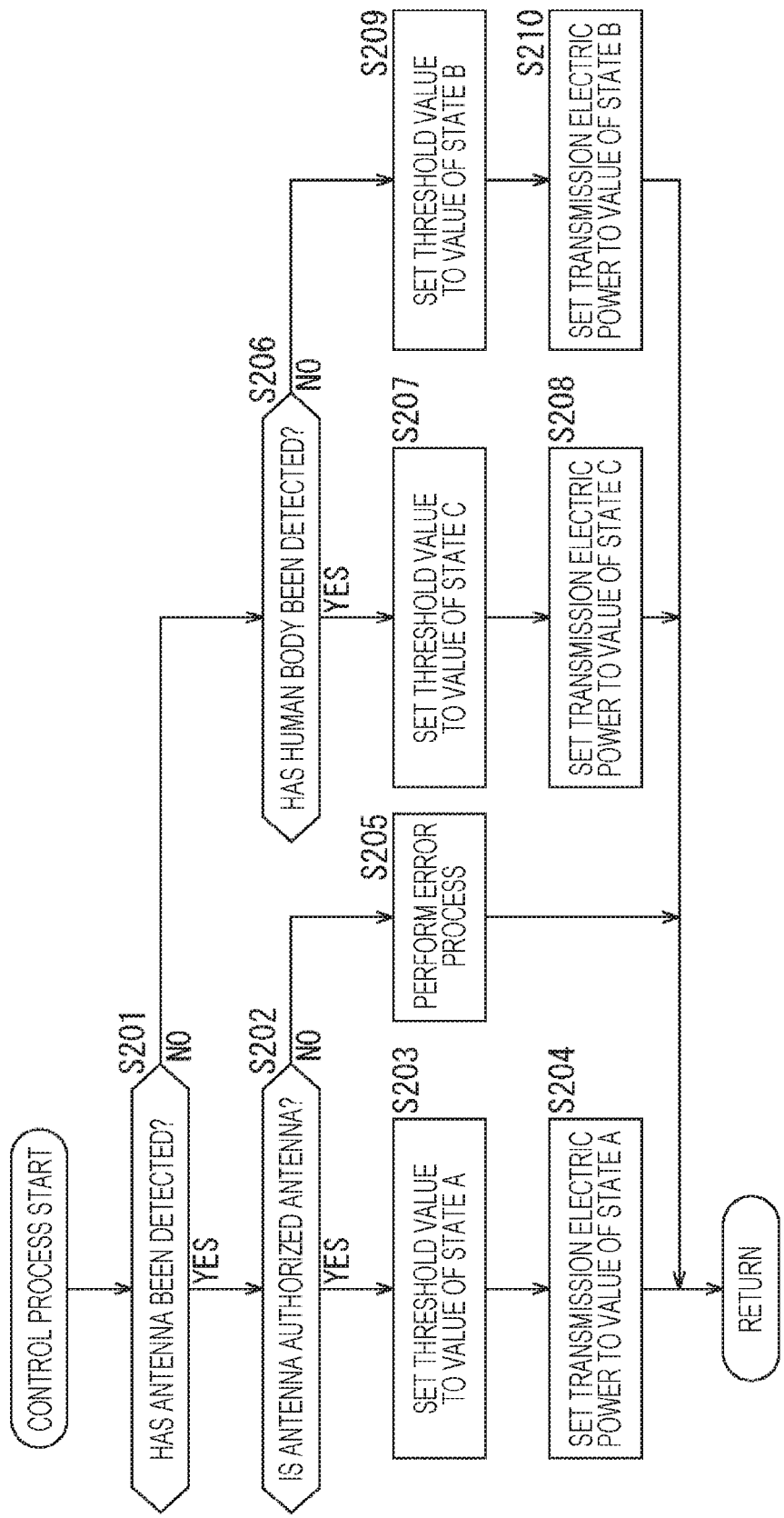
FIG. 18 is a flowchart for explaining an exemplary flow of a control process.

An exemplary flow of the control process in this case will be described with reference to a flowchart in FIG. 18.

When the control process is started, the state determination unit 193 determines in step S201 whether an antenna has been detected in the vicinity of the transmission apparatus 101. In a case where it is determined that an antenna has been detected by the process in step S101 of FIG. 14, the process proceeds to step S202.

Figure 14:
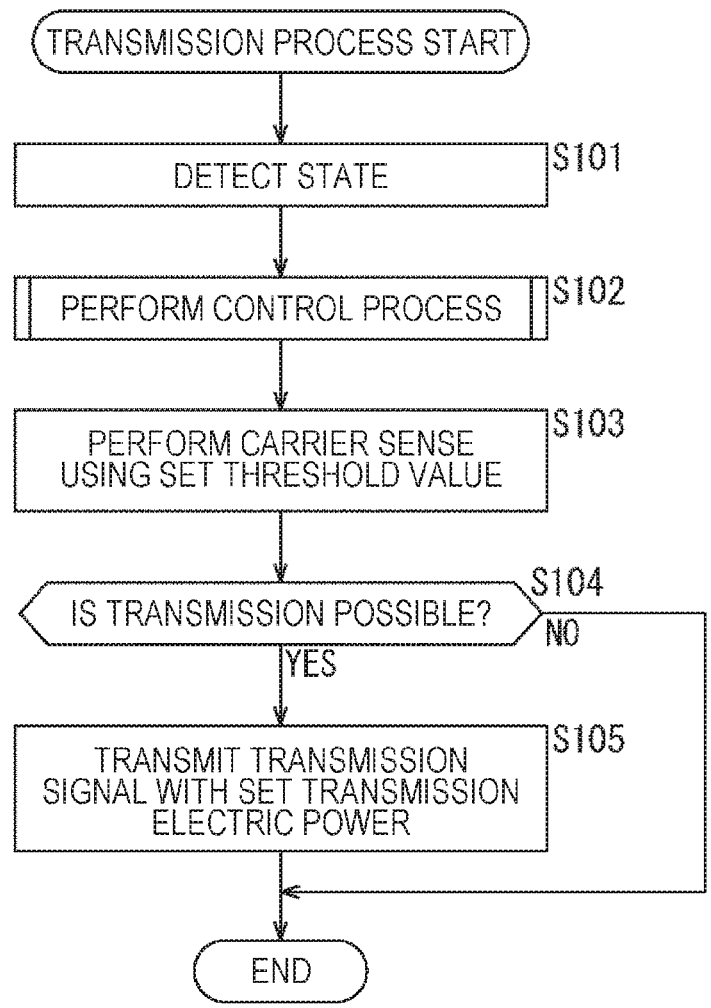
FIG. 14 is a flowchart for explaining an exemplary flow of a transmission process.
Figure 15:
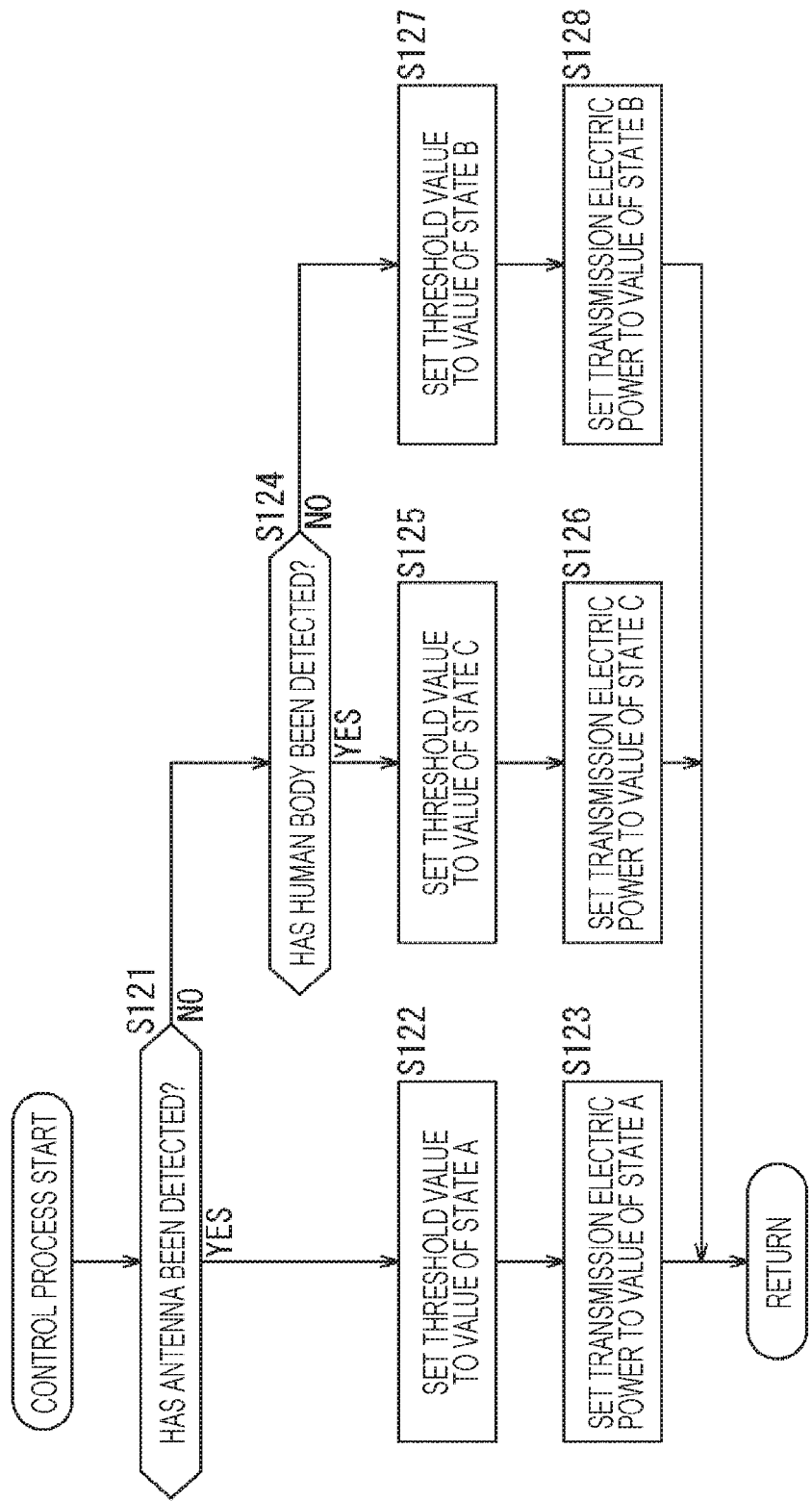
FIG. 15 is a flowchart for explaining an exemplary flow of a control process.

In step S202, the authentication unit 251 authenticates the antenna detected by the process in step S101 of FIG. 14 to determine whether the antenna is an authorized antenna. In a case where the authentication succeeds and it is determined that the antenna is an authorized antenna, the process proceeds to step S203. Processes in steps S203 and S204 are performed in a similar manner to the processes in steps S122 and S123 in FIG. 15, respectively.

Meanwhile, in a case where the authentication fails and it is determined that the antenna is not an authorized antenna in step S202, the process proceeds to step S205.

In step S205, the control unit 250 performs an error process. The content of this error process is arbitrary. In this case, the processes in steps S203 and S204 are omitted, the control process is terminated, and the process returns to FIG. 14.

Meanwhile, in a case where it is determined in step S201 that an antenna has not been detected in the vicinity of the transmission apparatus 101, the process proceeds to step S206. Processes in steps S206 to S210 are executed in a similar manner to the processes in steps S124 to S128 in FIG. 15, respectively.

By performing each process as described above, the control unit 185 can perform communication control according to the gain of the authorized antenna element and can implement more proper communication control under more diverse environments.

3. Third Embodiment

<Anti-Theft System>

The above description has explained the position notification system 100 as an example, but the present technology can be applied to any communication system. For example, the transmission apparatus 101 may be placed not only on a person but also on a moving body or the like.

Figure 19:
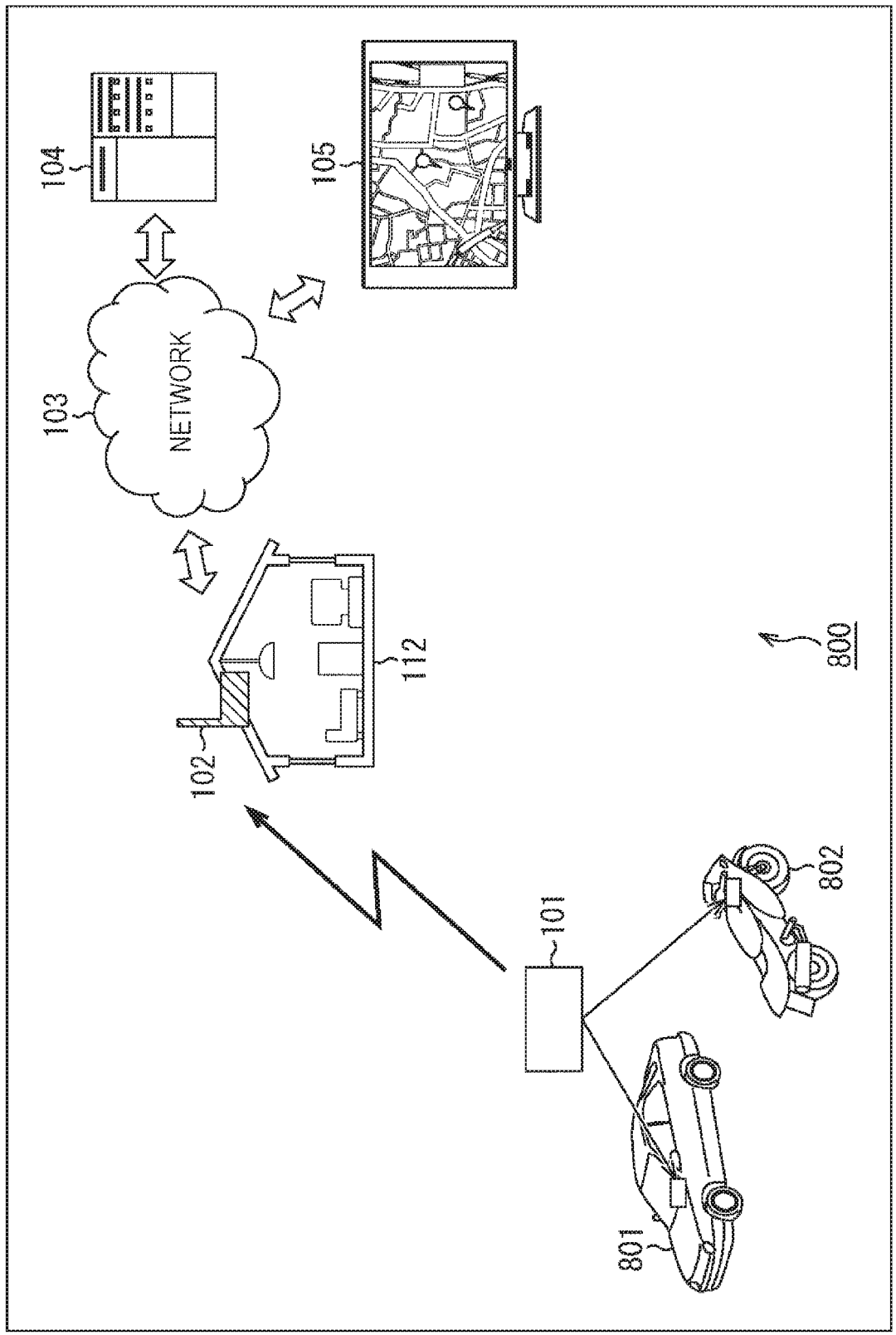
FIG. 19 is a diagram illustrating an exemplary main configuration of an anti-theft system.

For example, the present technology can also be applied to an anti-theft system 800 for preventing theft of automobiles, motorcycles, and the like as illustrated in FIG. 19. In the case of this anti-theft system 800, the transmission apparatus 101 is placed on a target object whose position is to be monitored by the user, for example, an automobile 801 and a motorcycle 802 owned by the user. As in the case of the position notification system 100, the transmission apparatus 101 notifies the high-sensitivity reception apparatus 102 of its own position information (that is, the position information of the automobile 801 and the motorcycle 802) as necessary. In other words, the user can access the server 104 from the terminal apparatus 105 to grasp the positions of the automobile 801 and the motorcycle 802 as in the case of the position notification system 100. Accordingly, even in the case of theft, the user can grasp the positions of the automobile 801 and the motorcycle 802, such that the user can easily retrieve these automobile 801 and motorcycle 802.

In the case of such an anti-theft system 800 as well, the present technology can be applied to the transmission apparatus 101 as in the case of the position notification system 100. Then, by applying the present technology, it is possible to suppress a reduction in communication characteristics.

<Other Communication Systems>

Note that the transmitted and received information is arbitrary. For example, the transmission unit 183 of the transmission apparatus 101 may generate transmission information including identification information of images, audio, measurement data, equipment, and the like, setting information of parameters, control information such as commands, and the like. In addition, this transmission information may include a plurality of types of information, for example, an image and audio or the identification information, the setting information, and the control information.

Furthermore, the transmission unit 183 may be enabled to generate the transmission information including, for example, information supplied from another apparatus. For example, the transmission unit 183 may generate the transmission information including information (sensor output) output from various types of sensors that perform detection, measurement, or the like on an arbitrary variable or the amount of a change therein, such as an image, light, luminosity, saturation, electricity, sound, vibration, acceleration, speed, angular velocity, force, temperature (not a temperature distribution), humidity, a distance, an area, a volume, a shape, a flow rate, time of the day, a time, magnetism, a chemical substance, or odor.

In other words, the present technology can be applied to a system used for arbitrary use such as three-dimensional shape measurement, space measurement, object observation, movement deformation observation, biometric observation, authentication processing, monitoring, autofocus, imaging control, illumination control, tracking processing, input/output control, electronic equipment control, and actuator control, for example.

Meanwhile, the present technology can be applied to a system in arbitrary fields such as traffic, medical care, crime prevention, agriculture, livestock industry, mining, beauty, factory, household appliance, meteorology, and natural surveillance, for example. For example, the present technology can be applied also to a system that picks up an image used for viewing purposes, using a digital camera, mobile equipment with a camera function, or the like. In addition, for example, the present technology can be applied also to a system used for traffic purposes, such as an in-vehicle system that picks up images of the front, back, surroundings, inside, and the like of an automobile for, for example, safe driving such as automatic stop and recognition of the state by the driver, a surveillance camera system that monitors traveling vehicles and roads, and a distance measuring system that measures a distance between vehicles, and the like. Furthermore, for example, the present technology can be applied also to a system used for security purposes, using a surveillance camera for crime prevention uses, a camera for person authentication uses, and the like. Additionally, for example, the present technology can be applied also to a system used for sports purposes, using various types of sensors or the like available for sports uses, such as wearable cameras. Moreover, for example, the present technology can be applied also to a system used for agricultural purposes, using various types of sensors such as cameras for monitoring the condition of fields and crops. In addition, for example, the present technology can be applied also to a system used for livestock industry purposes, using various types of sensors for monitoring the condition of domestic animals such as pigs and cattle. Furthermore, the present technology can be applied also to a system that monitors natural conditions such as volcanoes, forests, and oceans, for example, a meteorological observation system that observes weather, atmospheric temperature, humidity, wind speed, sunshine time, and the like, for example, a system that observes the ecology of wildlife such as birds, fish, reptiles, amphibians, mammals, insects, and plants, and the like for example.

<Communication Apparatus>

Furthermore, the specifications of wireless signals and information to be transmitted and received are arbitrary. In addition, the above description has explained an example in which the present technology is applied to the transmission apparatus. However, the present technology can be applied also to a reception apparatus that receives a signal and a transmission/reception apparatus that transmits and receives a signal. In other words, the present technology can be applied to arbitrary communication apparatuses and communication systems.

<Computer>

A series of the above-described processes can be executed by hardware as well and also can be executed by software. In a case where the series of processes is executed by software, for example, the control unit 185 and the control unit 250 of the transmission apparatus 101 are only required to have a configuration as a computer capable of executing the software. This computer includes, for example, a computer built into dedicated hardware, a general-purpose computer capable of executing arbitrary functions when installed with various types of programs, and the like.

FIG. 20 is a block diagram illustrating an exemplary configuration of the computer in that case.

The computer 900 illustrated in FIG. 20 is the control unit 185 or the control unit 250 having a configuration as a computer as described above and has a central processing unit (CPU) 901, a read only memory (ROM) 902, a random access memory (RAM) 903, and a bus 904. The CPU 901, the ROM 902, and the RAM 903 are mutually connected via the bus 904.

Additionally, an input/output interface 910 is connected to the bus 904. An input unit 911, an output unit 912, a storage unit 913, a communication unit 914, and a drive 915 are connected to the input/output interface 910.

The input unit 911 has an arbitrary input device such as a keyboard, a mouse, a touch panel, an image sensor, a microphone, a switch, and an input terminal, for example. The output unit 912 has an arbitrary output device such as a display, a speaker, and an output terminal, for example. The storage unit 913 has an arbitrary storage medium such as a non-volatile memory, for example, a hard disk, a RAM disk, a solid state drive (SSD), a universal serial bus (USB) memory, and the like. The communication unit 914 has a communication interface conforming to an arbitrary communication standard for wired or wireless communication or the both, such as Ethernet (registered trademark), Bluetooth (registered trademark), USB, high-definition multimedia interface (HDMI) (registered trademark), and infrared data association (IrDA), for example. The drive 915 drives a removable medium 921 having an arbitrary storage medium such as a magnetic disk, an optical disc, a magneto-optical disk, or a semiconductor memory.

In the computer 900 configured as described above, for example, a series of the above-described processes is performed in such a manner that the CPU 901 loads a program stored in the storage unit 913 to the RAM 903 via the input/output interface 910 and the bus 904 to execute. Data required by the CPU 901 when executing the various types of the processes, and so on are also stored in the RAM 903 as necessary.

For example, the program executed by the computer 900 (CPU 901) can be applied by being recorded in the removable medium 921 serving as a package medium or the like. In that case, the program can be installed to the storage unit 913 via the input/output interface 910 by mounting the removable medium 921 in the drive 915.

In addition, this program can be also provided via a wired or wireless transfer medium such as a local area network, the Internet, or digital satellite broadcasting. In that case, the program can be received by the communication unit 914 to be installed to the storage unit 913.

As an alternative manner, this program also can be installed to the ROM 902 or the storage unit 913 in advance.

Note that a part of a series of the above-described processes also can be executed by hardware and the others can be executed by software.

<Others>

The embodiments according to the present technology are not limited to the aforementioned embodiments and various modifications can be made without departing from the scope of the present technology.

In addition, for example, the present technology can be also carried out as any configuration constituting an apparatus or a system, for example, a processor serving as system large scale integration (LSI) or the like, a module using a plurality of processors or the like, a unit using a plurality of modules or the like, a set in which another function is further added to a unit, or the like (that is, a partial configuration of an apparatus).

Note that, in the present description, the system refers to a collection of a plurality of constituent members (e.g., apparatuses and modules (components)) and whether all the constituent members are arranged within the same cabinet is not regarded as important. Accordingly, a plurality of apparatuses accommodated in separate cabinets so as to be connected to one another via a network and one apparatus of which a plurality of modules is accommodated within one cabinet are both deemed as systems.

Additionally, for example, a configuration described as one apparatus (or a processing unit) may be divided so as to be configured as a plurality of apparatuses (or processing units). Or conversely, in the aforementioned cases, a configuration described as a plurality of apparatuses (or processing units) may be integrated so as to be configured as one apparatus (or one processing unit). In addition, as a matter of course, a configuration other than those described above may be employed to be added to the configurations of the respective apparatuses (or the respective processing units). Furthermore, a part of the configuration of a certain apparatus (or a certain processing unit) may be included in the configuration of another apparatus (or another processing unit) as long as the configuration or the action of the system as a whole is maintained substantially unchanged.

Meanwhile, for example, the present technology can employ a cloud computing configuration in which one function is divided and allocated to a plurality of apparatuses so as to be processed in coordination thereamong via a network.

In addition, for example, the above-described program can be executed by an arbitrary apparatus. In that case, that apparatus is only required to have necessary functions (function blocks or the like) such that necessary information can be obtained.

Furthermore, for example, the respective steps described in the aforementioned flowcharts can be executed by a plurality of apparatuses each taking a share thereof as well as executed by a single apparatus. Additionally, in a case where a plurality of processes is included in one step, the plurality of processes included in one step can be executed by a plurality of apparatuses each taking a share thereof as well as executed by a single apparatus.

Note that, the program executed by the computer may be designed in such a manner that the processes of steps describing the program are executed along the time series in accordance with the order described in the present description, or individually executed in parallel or at a necessary timing, for example, when called. In other words, as long as there is no inconsistency, the processes of the respective steps may be executed in an order different from the order described above. Furthermore, the processes of the steps describing this program may be executed in parallel with a process of another program, or may be executed in combination with a process of another program.

Note that, as long as there is no inconsistency, each of a plurality of the present technologies described in the present description can be independently carried out alone. As a matter of course, it is also possible to carry out an arbitrary plurality of the present technologies at the same time. For example, the present technology described in any of the embodiments can be carried out in combination with the present technology described in another embodiment. In addition, an arbitrary one of the present technologies described above can be carried out with another technology not mentioned above at the same time.

Note that the present technology can be also configured as described below.

(1) A communication apparatus that performs wireless communication via an antenna element, the communication apparatus including:

a state detection unit that detects a state of a gain of the antenna element;

a control unit that controls a threshold value for carrier sense on the basis of the state of the gain of the antenna element detected by the state detection unit;

a carrier sense unit that performs the carrier sense and determines whether communication using the threshold value set by the control unit is possible; and a communication unit that performs wireless communication in a case where it is determined by the carrier sense unit that the communication is possible.

(2) The communication apparatus according to (1), in which the state detection unit detects a coupled antenna element positioned in the vicinity of the communication apparatus and having a higher gain than a gain of the antenna element of the communication apparatus.

(3) The communication apparatus according to (1) or (2), in which the state detection unit detects the coupled antenna element by detecting a change in a magnetic field around the communication apparatus.

(4) The communication apparatus according to any one of (1) to (3), in which the control unit:

sets the threshold value to a value for a state in which a gain of the antenna element is high in a case where the coupled antenna element is detected by the state detection unit; and sets the threshold value to a value for a state in which a gain of the antenna element is low in a case where the coupled antenna element is not detected by the state detection unit.

(5) The communication apparatus according to any one of (1) to (4), in which
the state detection unit detects a human body positioned in the vicinity of the communication apparatus.

(6) The communication apparatus according to any one of (1) to (5), in which
the state detection unit detects the human body by detecting a change in capacitance.

(7) The communication apparatus according to any one of (1) to (6), in which
the control unit:
sets the threshold value to a value for a state in which a gain of the antenna element is low in a case where the human body is detected by the state detection unit; and
sets the threshold value to a value for a state in which a gain of the antenna element is high in a case where the human body is not detected by the state detection unit.

(8) The communication apparatus according to any one of (1) to (7), in which
the state detection unit detects a coupled antenna element positioned in the vicinity of the communication apparatus and having a higher gain than a gain of the antenna element of the communication apparatus and detects a human body positioned in the vicinity of the communication apparatus.

(9) The communication apparatus according to any one of (1) to (8), in which
the control unit:
sets the threshold value to a value for a state in which a gain of the antenna element is high in a case where the coupled antenna element is detected by the state detection unit;
sets the threshold value to a value for a state in which a gain of the antenna element is medium in a case where either the coupled antenna element or the human body is not detected by the state detection unit; and
sets the threshold value to a value for a state in which a gain of the antenna element is low in a case where the coupled antenna element is not detected but the human body is detected by the state detection unit.

(10) The communication apparatus according to any one of (1) to (9), in which
the control unit sets the threshold value to a value according to the state of the gain of the antenna element detected by the state detection unit, on the basis of table information indicating a correspondence relationship between the state of the gain of the antenna element and the threshold value.

(11) The communication apparatus according to any one of (1) to (10), in which
the control unit further controls transmission electric power for a transmission signal on the basis of the state of the gain of the antenna element detected by the state detection unit, and
the communication unit transmits the transmission signal with the transmission electric power set by the control unit.

(12) The communication apparatus according to any one of (1) to (11), in which
the state detection unit detects a coupled antenna element positioned in the vicinity of the communication apparatus and having a higher gain than a gain of the antenna element of the communication apparatus, and
the control unit:
sets the transmission electric power to a value for a state in which a gain of the antenna element is high in a case where the coupled antenna element is detected by the state detection unit; and
sets the transmission electric power to a value for a state in which a gain of the antenna element is low in a case where the coupled antenna element is not detected by the state detection unit.

(13) The communication apparatus according to any one of (1) to (12), in which
the state detection unit detects a human body positioned in the vicinity of the communication apparatus, and
the control unit:
sets the transmission electric power to a value for a state in which a gain of the antenna element is low in a case where the human body is detected by the state detection unit; and
sets the transmission electric power to a value for a state in which a gain of the antenna element is high in a case where the human body is not detected by the state detection unit.

(14) The communication apparatus according to any one of (1) to (13), in which
the state detection unit detects a coupled antenna element positioned in the vicinity of the communication apparatus and having a higher gain than a gain of the antenna element of the communication apparatus and detects a human body positioned in the vicinity of the communication apparatus, and
the control unit:
sets the transmission electric power to a value for a state in which a gain of the antenna element is high in a case where the coupled antenna element is detected by the state detection unit;
sets the transmission electric power to a value for a state in which a gain of the antenna element is medium in a case where either the coupled antenna element or the human body is not detected by the state detection unit; and
sets the transmission electric power to a value for a state in which a gain of the antenna element is low in a case where the coupled antenna element is not detected but the human body is detected by the state detection unit.

(15) The communication apparatus according to any one of (1) to (14), in which
the control unit sets the transmission electric power to a value according to the state of the gain of the antenna element detected by the state detection unit, on the basis of table information indicating a correspondence relationship between the state of the gain of the antenna element and the transmission electric power.

(16) The communication apparatus according to any one of (1) to (15), in which
the state detection unit detects a coupled antenna element positioned in the vicinity of the communication apparatus and having a higher gain than a gain of the antenna element of the communication apparatus, and
the control unit authenticates the coupled antenna element detected by the state detection unit and, in a case where the coupled antenna element is authenticated, sets the threshold value to a value for a state in which a gain of the antenna element is high.

(17) The communication apparatus according to any one of (1) to (16), in which
the control unit further sets transmission electric power for a transmission signal to a value for a state in which a gain of the antenna element is high in a case where the coupled antenna element detected by the state detection unit is authenticated.

(18) The communication apparatus according to any one of (1) to (17), in which
the state detection unit acquires a quick response (QR) code (registered trademark) including information relating to the coupled antenna element, and
the control unit authenticates the coupled antenna element by authenticating the QR code (registered trademark) acquired by the state detection unit.

(19) A communication method by a communication apparatus that performs wireless communication via an antenna element, the communication method including:
detecting a state of a gain of the antenna element;
controlling a threshold value for carrier sense on the basis of the state of the gain of the antenna element that has been detected;
performing the carrier sense and determining whether communication using the threshold value that has been set is possible; and
performing wireless communication in a case where it is determined that the communication is possible.

(20) A communication system including a communication apparatus and an antenna apparatus, in which
the antenna apparatus includes:
a coupled antenna element excited by a wireless signal from the communication apparatus positioned in the vicinity of the antenna apparatus; and
a notification unit that notifies the communication apparatus that the communication apparatus is positioned in the vicinity of the antenna apparatus, and
the communication apparatus includes:
a detection unit that detects the antenna apparatus positioned in the vicinity of the communication apparatus on the basis of a notification from the notification unit of the antenna apparatus;
a control unit that controls a threshold value for carrier sense on the basis of a detection result by the detection unit;
a carrier sense unit that performs the carrier sense and determines whether communication using the threshold value set by the control unit is possible; and
a communication unit that performs wireless communication in a case where it is determined by the carrier sense unit that the communication is possible.

REFERENCE SIGNS LIST

100 Position notification system
101 Transmission apparatus
102 High-sensitivity reception apparatus
103 Network
104 Server
111 Elderly (human body)
140 Jacket
141 Pocket
142 Antenna apparatus
151 Antenna element
152 Magnetic material
161 Coupled antenna element
162 Magnet
163 Reflection plate
170 Stick
181 Selection unit
182 Carrier sense unit
183 Transmission unit
184 State detection unit
185 Control unit
186 Position fixing unit
191 Antenna element detection unit
192 Human body detection unit
193 State determination unit
194 Threshold value control unit
195 Transmission electric power control unit
201 Proximity notification unit
202 Position fixing unit
250 Control unit
251 Authentication unit
800 Anti-theft system

The invention claimed is:

1. A communication apparatus that performs wireless communication via an antenna, the communication apparatus comprising:
a memory storing program code, and
a processor configured to execute the program code to perform operations comprising:
detecting a state of a gain of the antenna;
controlling a threshold value for carrier sense on the basis of the state of the gain of the antenna;
performing the carrier sense and determining whether communication using the threshold value is possible; and
performing wireless communication in a case where it is determined that the communication is possible.

2. The communication apparatus according to claim 1, wherein the operations further comprise:
detecting a coupled antenna positioned in the vicinity of the communication apparatus and having a higher gain than a gain of the antenna of the communication apparatus.

3. The communication apparatus according to claim 2, wherein the operations further comprise:
detecting the coupled antenna by detecting a change in a magnetic field around the communication apparatus.

4. The communication apparatus according to claim 2, wherein
the operations further comprise:
setting the threshold value to a value for a state in which a gain of the antenna is high in a case where the coupled antenna is detected; and
setting the threshold value to a value for a state in which a gain of the antenna is low in a case where the coupled antenna is not detected.

5. The communication apparatus according to claim 1, wherein the operations further comprise:
detecting a human body positioned in the vicinity of the communication apparatus.

6. The communication apparatus according to claim 5, wherein the operations further comprise:
detecting the human body by detecting a change in capacitance.

7. The communication apparatus according to claim 5, wherein
the operations further comprise:
setting the threshold value to a value for a state in which a gain of the antenna is low in a case where the human body is detected; and
setting the threshold value to a value for a state in which a gain of the antenna is high in a case where the human body is not detected.

8. The communication apparatus according to claim 1, wherein the operations further comprise:
detecting a coupled antenna positioned in the vicinity of the communication apparatus and having a higher gain than a gain of the antenna of the communication apparatus and detecting a human body positioned in the vicinity of the communication apparatus.

9. The communication apparatus according to claim 8, wherein the operations further comprise:
setting the threshold value to a value for a state in which a gain of the antenna is high in a case where the coupled antenna is detected;
setting the threshold value to a value for a state in which a gain of the antenna is medium in a case where either the coupled antenna or the human body is not detected; and
setting the threshold value to a value for a state in which a gain of the antenna is low in a case where the coupled antenna is not detected but the human body is detected.

10. The communication apparatus according to claim 1, wherein the operations further comprise:
setting the threshold value to a value according to the state of the gain of the antenna, on the basis of table information indicating a correspondence relationship between the state of the gain of the antenna and the threshold value.

11. The communication apparatus according to claim 1, wherein the operations further comprise:
controlling transmission electric power for a transmission signal on the basis of the state of the gain of the antenna, and
transmitting the transmission signal with the transmission electric power.

12. The communication apparatus according to claim 11, wherein the operations further comprise:
detecting a coupled antenna positioned in the vicinity of the communication apparatus and having a higher gain than a gain of the antenna of the communication apparatus, and
setting the transmission electric power to a value for a state in which a gain of the antenna is high in a case where the coupled antenna is detected; and
setting the transmission electric power to a value for a state in which a gain of the antenna is low in a case where the coupled antenna is not detected.

13. The communication apparatus according to claim 11, wherein the operations further comprise:
detecting a human body positioned in the vicinity of the communication apparatus;
setting the transmission electric power to a value for a state in which a gain of the antenna is low in a case where the human body is detected; and
setting the transmission electric power to a value for a state in which a gain of the antenna is high in a case where the human body is not detected.

14. The communication apparatus according to claim 11, wherein the operations further comprise:
detecting a coupled antenna positioned in the vicinity of the communication apparatus and having a higher gain than a gain of the antenna of the communication apparatus and detecting a human body positioned in the vicinity of the communication apparatus;
setting the transmission electric power to a value for a state in which a gain of the antenna is high in a case where the coupled antenna is detected; and
setting the transmission electric power to a value for a state in which a gain of the antenna is medium in a case where either the coupled antenna or the human body is not detected; and
setting the transmission electric power to a value for a state in which a gain of the antenna is low in a case where the coupled antenna is not detected but the human body is detected.

15. The communication apparatus according to claim 11, wherein the operations further comprise:
setting the transmission electric power to a value according to the state of the gain of the antenna, on the basis of table information indicating a correspondence relationship between the state of the gain of the antenna and the transmission electric power.

16. The communication apparatus according to claim 1, wherein the operations further comprise:
detecting a coupled antenna positioned in the vicinity of the communication apparatus and having a higher gain than a gain of the antenna of the communication apparatus, and
authenticating the coupled antenna and, in a case where the coupled antenna is authenticated, setting the threshold value to a value for a state in which a gain of the antenna is high.

17. The communication apparatus according to claim 16, wherein the operations further comprise:
setting transmission electric power for a transmission signal to a value for a state in which a gain of the antenna is high in a case where the coupled antenna is authenticated.

18. The communication apparatus according to claim 16, wherein the operations further comprise:
acquiring a quick response (QR) code including information relating to the coupled antenna, and
authenticating the coupled antenna by authenticating the QR code.

19. A communication method by a communication apparatus that performs wireless communication via an antenna, the communication method comprising:
detecting a state of a gain of the antenna;
controlling a threshold value for carrier sense on the basis of the state of the gain of the antenna that has been detected;
performing the carrier sense and determining whether communication using the threshold value that has been set is possible; and
performing wireless communication in a case where it is determined that the communication is possible.

20. A communication system comprising:
a communication apparatus according to claim 1; and
an antenna apparatus.

* * * * *